(12) United States Patent
Yates et al.

(10) Patent No.: US 10,962,629 B2
(45) Date of Patent: Mar. 30, 2021

(54) INDUSTRIAL SAFETY SENSOR

(71) Applicant: Rockwell Automation Technologies, Inc., Mayfield Heights, OH (US)

(72) Inventors: Chris Yates, Corstorphine (GB);
Frederic Boutaud, Lexington, MA (US); Igor Abrosimov, Dalkeith (GB);
Chris Softley, Midlothian (GB);
Michael M. Tilleman, Brookline, MA (US); Richard Galera, Nashua, NH (US); Arvind Ananthanaraya, Medford, MA (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 0 days.

(21) Appl. No.: 16/927,127

(22) Filed: Jul. 13, 2020

(65) Prior Publication Data
US 2020/0341126 A1    Oct. 29, 2020

Related U.S. Application Data

(63) Continuation of application No. 16/376,009, filed on Apr. 5, 2019, now Pat. No. 10,725,157.

(51) Int. Cl.
*G01C 3/08* (2006.01)
*G01S 7/497* (2006.01)
(Continued)

(52) U.S. Cl.
CPC ............ *G01S 7/497* (2013.01); *G01S 7/4816* (2013.01); *G01S 7/4863* (2013.01)

(58) Field of Classification Search
CPC ....... G01S 7/497; G01S 7/4816; G01S 7/4863
See application file for complete search history.

(56) References Cited

U.S. PATENT DOCUMENTS

| | | | | |
|---|---|---|---|---|
| 4,699,508 A | * | 10/1987 | Bolkow | G01S 7/4818 356/5.07 |
| 5,970,433 A | * | 10/1999 | Oka | G01S 7/4811 702/159 |

(Continued)

FOREIGN PATENT DOCUMENTS

EP     3282286     2/2018

OTHER PUBLICATIONS

Extended European Search Report from European Application No. 20167720.0 dated Jul. 22, 2020, 9 pages.

*Primary Examiner* — Samantha K Abraham

(57) ABSTRACT

An active illumination three-dimensional sensor device is configured with a number of diagnostic functions that can satisfy the requirements of industrial safety within the context of a single-channel safety sensor architecture. The sensor diagnostic functions provide sufficient diagnostic coverage for an optical safety sensor (e.g., a time-of-flight safety sensor) to achieve a desired safety integrity level without the need for multiple channels. The diagnostic features can be applied to one or more components along the single-channel path (e.g., the sequencer, the illumination source, input and/or output optics, image sensor pixel, etc.) to provide a level of diagnostic coverage that renders the optical safety sensor suitable for use within industrial safety applications requiring high safety integrity levels.

19 Claims, 22 Drawing Sheets

(51) Int. Cl.
    *G01S 7/481*    (2006.01)
    *G01S 7/4863*    (2020.01)

(56) References Cited

U.S. PATENT DOCUMENTS

| | | | |
|---|---|---|---|
| 2007/0215822 A1 | 9/2007 | Wuestefeld | |
| 2010/0177315 A1* | 7/2010 | Sudo | G02B 7/1825 |
| | | | 356/400 |
| 2015/0285912 A1 | 10/2015 | Hammes | |
| 2015/0331107 A1* | 11/2015 | Galera | G06K 9/605 |
| | | | 382/165 |

* cited by examiner

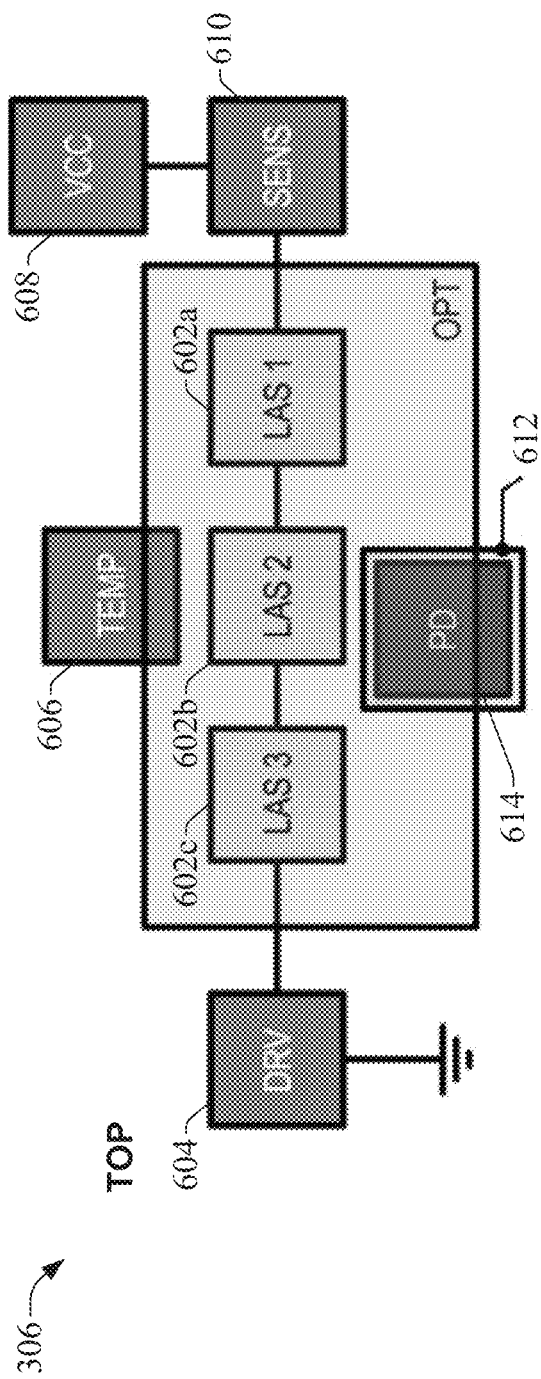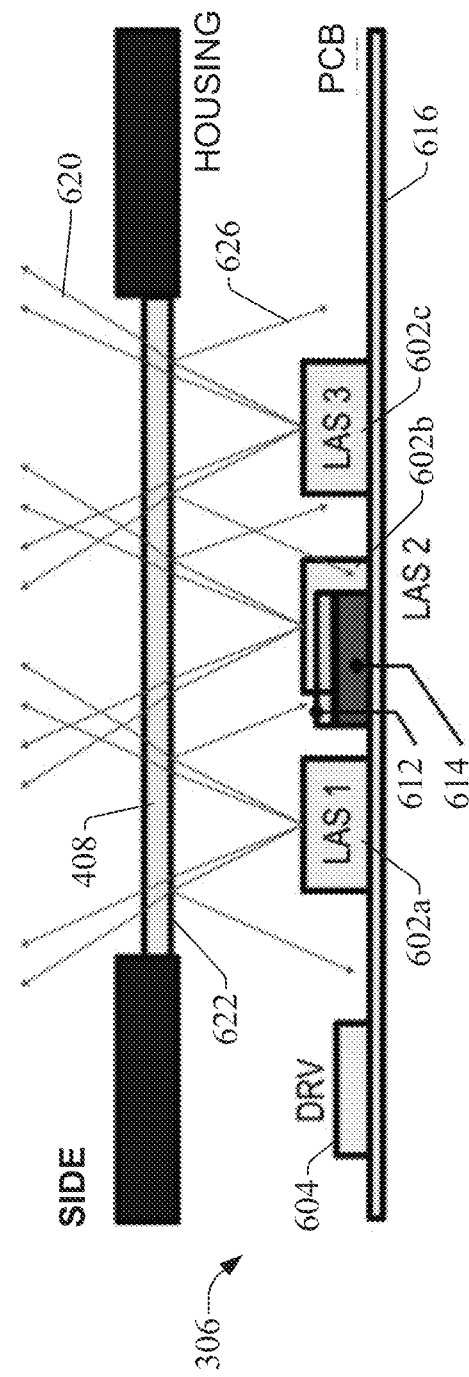
FIG. 6

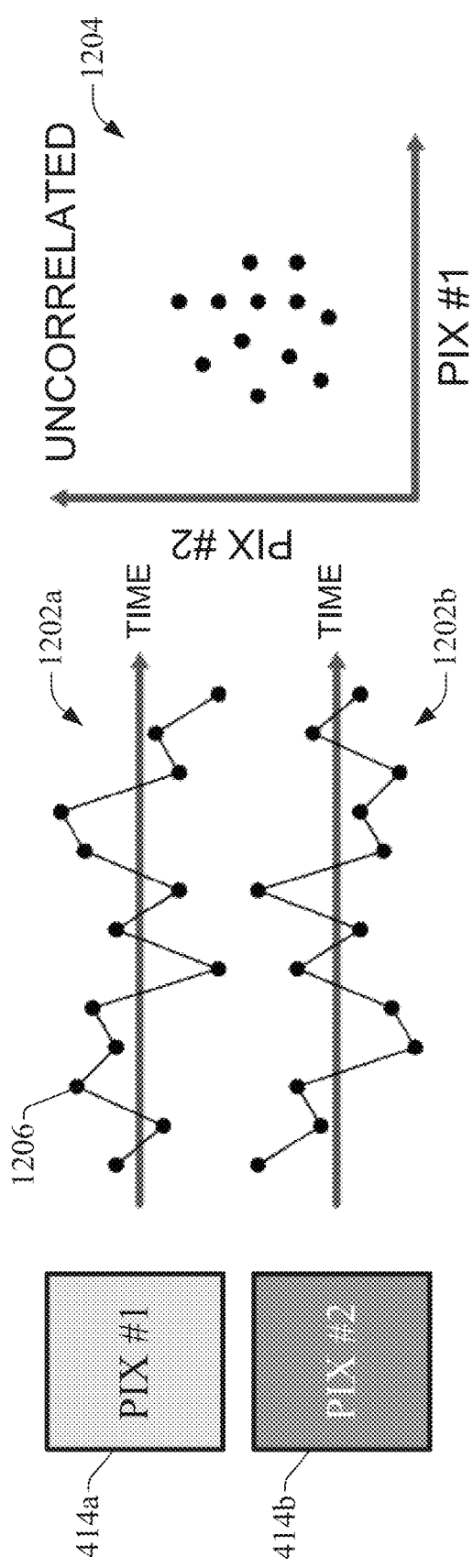
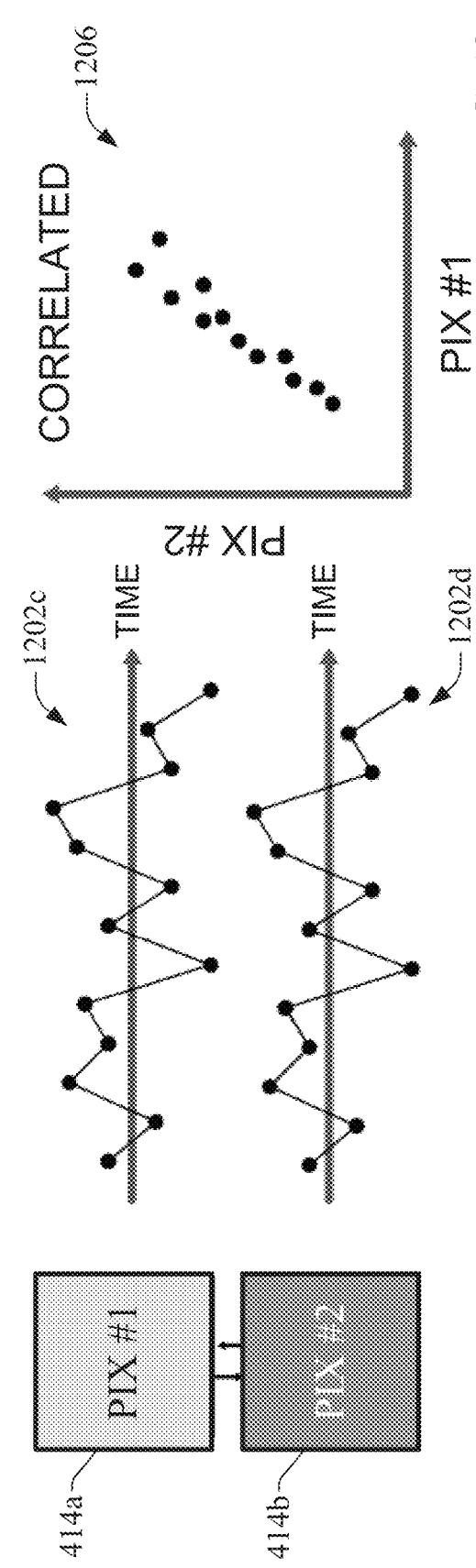
FIG. 12a
FIG. 12b

INDUSTRIAL SAFETY SENSOR

CROSS-REFERENCE TO RELATED APPLICATIONS

This application is a continuation of, and claims priority to, U.S. patent application Ser. No. 16/376,009, filed on Apr. 5, 2019, and entitled "INDUSTRIAL SAFETY SENSOR." The entirety of the related patent application is incorporated herein by reference.

BACKGROUND

The subject matter disclosed herein relates generally to industrial safety, and, more particularly, to three-dimensional safety sensors.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an active illumination three-dimensional (3D) sensor system is provided. The 3D sensor system includes an illumination source configured to emit light pulses to a monitored area and an auxiliary illumination source mounted inside a housing of the 3D sensor system and oriented to emit auxiliary light pulses toward an inner surface of the housing. The 3D sensor system includes an image sensor including an array of pixels. The image sensor is configured to measure a quantity of light received at a pixel of the array of pixels and generate electrical charge in proportion to the quantity of light and measure, during a diagnostic test sequence, a subset of the auxiliary light pulses reflected from the inner surface of the housing and received at the pixel as reflected auxiliary light pulses. The 3D sensor system includes one or more processors configured to: convert the electrical charge to one or more digital data values representing the quantity of light received at the pixel; determine a distance of a surface within the monitored scene based on analysis of the one or more digital data values; perform, during the diagnostic test sequence, multiple iterations of the emission of the auxiliary light pulses and the exposure of the pixel; generate multiple digital test data values respectively corresponding to the multiple iterations based on measurements of the subset of the auxiliary light pulses taken by the pixel during respective iterations of the multiple iterations; create a temporal sequence of the multiple digital test data values as a function of the time of the emission relative to the exposure; generate waveform data for the pixel using the temporal sequence of the multiple digital test data values; and generate diagnostic data for the pixel based on analysis of the waveform data.

Also, one or more embodiments provide a method for performing diagnostics on an active illumination three-dimensional (3D) sensor, comprising emitting, by an auxiliary illumination source mounted inside a housing of the 3D sensor, auxiliary light pulses toward an inner surface of the housing; measuring, by an image sensor of the 3D sensor, a subset of the auxiliary light pulses reflected from the inner surface and received at a pixel of the image sensor as reflected auxiliary light pulses to yield test measurement data, wherein the measuring comprises: performing multiple iterations of the emitting and the measuring; and generating multiple test measurement data values corresponding to the multiple iterations, respectively, based on measurements of the subset of the auxiliary light pulses taken by the pixel during the respective iterations; generating a temporal sequence of the multiple test measurement data values as a function of the time of the emitting relative to the time of the measuring to yield sequenced data; applying a curve-fitting function to the sequenced data to yield waveform data for the pixel; and generating diagnostic data for the pixel based on analysis of the waveform data, wherein the diagnostic data indicates a failure of the 3D sensor.

Also, one or more embodiments provide a method for performing diagnostics on an active illumination three-dimensional (3D) sensor, comprising: emitting, by an auxiliary illumination source mounted inside a housing of the 3D sensor, auxiliary light pulses toward an inner surface of the housing; measuring, by an image sensor of the 3D sensor, a subset of the auxiliary light pulses reflected from the inner surface and received at a pixel of the image sensor as reflected auxiliary light pulses to yield test measurement data; generating, by one or more processors of the 3D image sensor, diagnostic data for the pixel based on analysis of the test measurement data, wherein the diagnostic data indicates a failure of the 3D sensor; emitting, by a diagnostic illumination source, light across an external surface of the at least one of an input optic of the 3D sensor, an output optic of the 3D sensor, or a protective window of the 3D sensor at a glancing angle relative to the external surface; receiving, by a detector, a subset of the light reflected from the external surface; monitoring, by the detector, at least one of an amplitude of the subset of the light or a direction from which the subset of the light is received at the detector; and in response to determining, based on the monitoring, that at least one of the amplitude or the direction deviates from a defined tolerance, generating an error message.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 6 is a top view and a side view of an example illumination source that includes integrated diagnostic features.

FIG. 12a is a graph of time series measurement data and a scatter plot for an example scenario in which a first pixel and a second pixel are independent of one another.

FIG. 12b is a graph of time series measurement data and a scatter plot for an example scenario in which a first pixel is cross-correlated with a second pixel.

DETAILED DESCRIPTION

Figure 1:
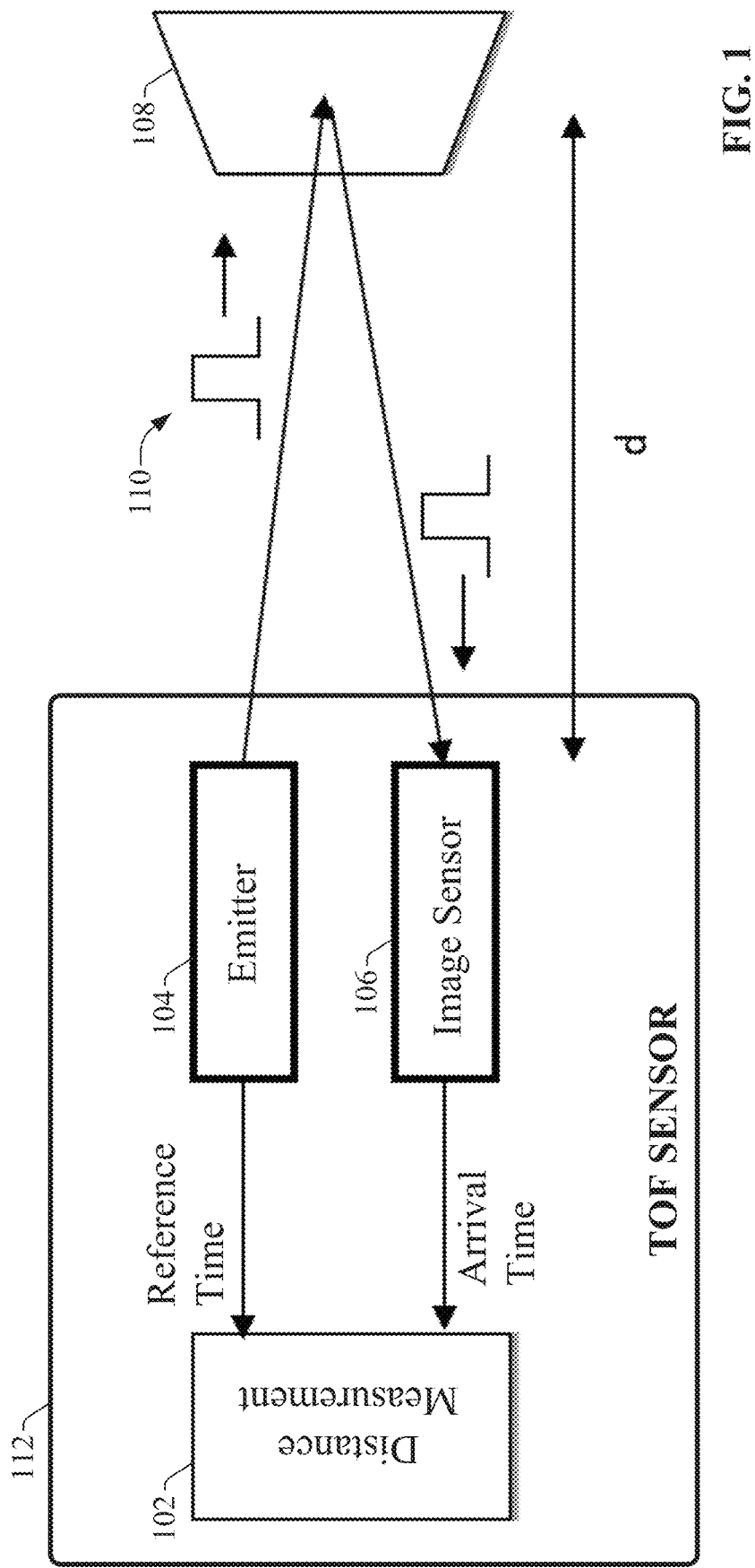
FIG. 1 is a generalized block diagram of a time-of-flight (TOF) sensor illustrating the principle of a typical time-of-flight measurement.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many technologies exist for detecting distances of objects or surfaces within a monitored space. These include, but are not limited to, time-of-flight (TOF) optical sensors or other types of active illumination three-dimensional sensors—such as photo detectors or multi-pixel image sensors—which are used to detect distances of objects or surfaces within a viewing range of the sensor. An example optical sensor can include photo detectors that measure and generate a single distance data point for an object within range of the detector, as well as multi-pixel image sensors comprising an array of photo-detectors that are each capable of generating a distance data point for a corresponding image pixel. Some three-dimensional optical sensors, such as stereo vision technology or structured light technology measure distances using triangulation.

Some types of TOF sensors that employ pulsed light illumination operate by measuring the elapsed time between emission of a light pulse into the viewing field (or viewing space) and receipt of the subsequently reflected light pulse, from objects or surfaces within the viewing field, at the sensor's photo-receiver. This time-of-flight information is proportional to the distance to the object; thus, the sensor is able to determine the distance of the object or surface point from the sensor.

FIG. 1 is a generalized block diagram of a TOF sensor 112 illustrating the principle of a typical time-of-flight measurement. In general, the sensing technology used by some TOF sensors measures the time taken by a light pulse to travel from the sensor's illumination light source—represented by emitter 104—to an object 108 or surface within the viewing field and back to the sensor's light photo-detectors, represented by image sensor 106. Image sensor 106 can be, for example a dedicated multi-pixel CMOS (complementary metal oxide semiconductor) application-specific integrated circuit (ASIC) imager that integrates specialized means for measuring the position in time of received pulses. Distance measurement components 102 can measure the distance d to the object 108 as $$d = \frac{c \times t}{2} \quad (1)$$

where c is the speed of light, and t is the measured time of the round trip for the pulse from the emitter 104 to the object 108 and back to the sensor 106.

Emitter 104 of the TOF sensor 112 emits a short light pulse 110 into the viewing field. Objects and surfaces within the viewing field, such as object 108, reflect part of the pulse's energy back to the TOF sensor 112, and the reflected pulse is detected by respective pixels of image sensor 106 (e.g., a photo-detector or a photo-sensor such as a photo-diode). Since the speed of light in vacuo c is a known constant and the time t elapsed between emission and reception of the pulse 110 can be measured or extracted, the distance measurement components 102 can determine, for each pixel of the sensor 106, the distance between the object 108 and the sensor by calculating half of the round-trip time, as given by equation (1) above, or using another suitable calculation technique. Collectively, the distance information obtained for all pixels of the image sensor 106 yields depth or range map for the viewing space. In some implementations, distance measurement components 102 can include a timer that measures the arrival time of the received pulse relative to the time at which emitter 104 emitted the pulse. In general, the TOF sensor 112 generates information that is representative of the position in time of the received pulse.

Some types of TOF sensors 112 project the pulsed light as a wide light beam toward an area to be monitored and analyze the reflected light received from surfaces and objects within the viewing area. Other types of sensors 112 may sweep a narrow, collimated, or planar pulsed light beam across the viewing area in an oscillatory manner to collect and analyze line-wise or point-wise image data. In other implementations, the sensor 112 may project a stationary, substantially planar beam of pulsed light across an area of interest and collect data on objects that pass through the beam.

Figure 2:
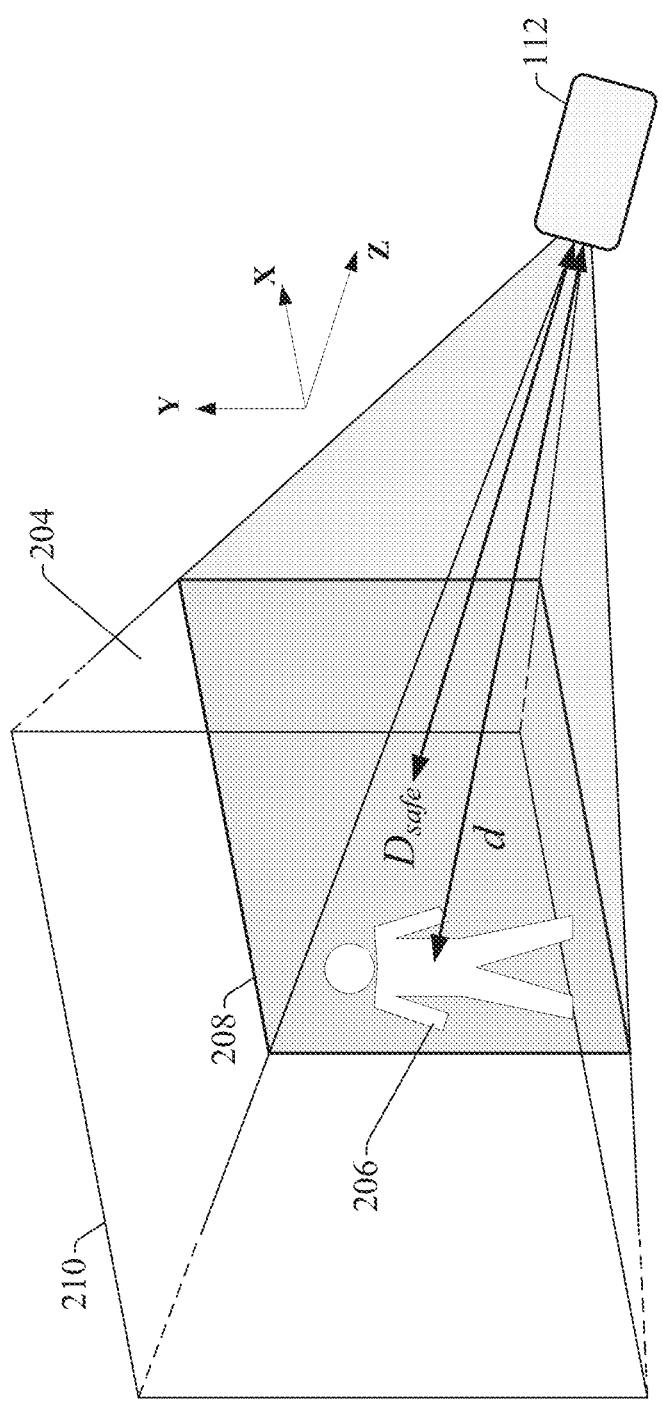
FIG. 2 is a schematic illustrating detection of a person within a zone monitored by a TOF-based safety sensor.

If a TOF sensor's distance calculation capabilities are sufficiently robust and reliable, the sensor can serve as an industrial safety device for an industrial safety system. FIG. 2 is a schematic illustrating detection of a person 206 within a monitored zone by a TOF sensor 112. In an example implementation, the TOF sensor 112 can be oriented and configured to monitor for intrusion of people 206 or objects (e.g., forklifts or other vehicles, moving machinery, etc.) within a defined protected zone, and to initiate a safety measure in response to detection of a person 206 or object within the protected zone. In the example depicted in FIG. 2, the sensor 112 (or an associated supervisory controller or safety relay) is configured to initiate the safety measure if a person 206 (or another prohibited object) is detected within a defined field of view (FOV) 210 (which may be less than a maximum field of view capable of being monitored by the sensor 112) at a perpendicular distance d (along the z-axis) from the sensor that is less than a defined safe distance $D_{safe}$ (along the z-axis). This yields a protected zone represented by the shaded volume illustrated in FIG. 2. Safety actions initiated by the sensor 112 in response to detection of a person 206 or object within this protected zone can include, for example, disconnection of power from a hazardous automated machine, placement of the machine in a safe operating mode (e.g., a slow operating mode), altering the trajectory of the machine to avoid the path of a detected person, or other such safety actions.

Although the boundary of the protected zone in the z-axis direction (along the projection axis of the sensor 112) is depicted as a plane 208 in FIG. 2, some TOF sensors 112 can allow the safe distance $D_{safe}$ to be defined individually for each pixel of the monitored scene, or for respective groups of pixels, yielding a boundary having a non-planar geometric shape.

Industrial safety devices that are designed to operate in critical processes and protect against hazard to humans are typically characterized by Safety Integrity Levels (SILs), which define levels of performance requirements that are satisfied by the safety device. In general, the SIL level of a device defines a level of protection afforded by the device. The SIL level required for a given industrial application is typically a function of the hazard frequency and hazard severity expected of the application. When combined with a risk assessment of the hazard, SIL levels provide a simple means for safety engineers to implement safety solutions to protect workers from industrial hazards, and offer a sequential series of decreasing probabilities of failure for the safety device in question. Typically, a manufacturer will assign a SIL level to a particular safety device depending on its capabilities, having demonstrated conformance to the relevant standard IEC 61508.

In order to satisfy the requirements dictated by SIL standards, an industrial safety device must be designed with a high degree of reliability, and must be designed such that a failure of one or more components of the safety device does not compromise the reliability of the device safety function or otherwise result in an unsafe environment. Some safety devices improve safety reliability using hardware redundancy. For example, multiple redundant independent image sensors may be used to extract three-dimensional data from a monitored space, thereby affording hardware redundancy by producing multiple sets of the same measured data. In this example scenario, a failure of one image sensor does not impact the ability of the safety device to detect an object, since objects can still be detected based on data acquired by the other image sensors. Hardware redundancy can also be applied to other components of an industrial device depending on the design. Implementation of redundant hardware in a safety device yields a multi-channel architecture.

While affording a high degree of reliability, implementation of hardware redundancy to satisfy SIL requirements can also introduce complexity, size, and cost to the safety device. To address these and other issues, one or more embodiments described herein implement a number of auxiliary diagnostic functions within a single-channel safety sensor architecture to satisfy the requirements of SIL safety. One or more of the diagnostic functions described herein provide sufficient diagnostic coverage for an optical safety sensor (e.g., a TOF safety sensor or other types of active illumination 3D sensors) to achieve a desired safety integrity level without the need for multiple channels. The diagnostic features can be applied to one or more components along the single-channel path (e.g., the sequencer, the illumination source, input and/or output optics, image sensor pixel, etc.) to provide a level of diagnostic coverage that renders the optical safety sensor suitable for use within industrial safety applications requiring high SIL.

Figure 3:
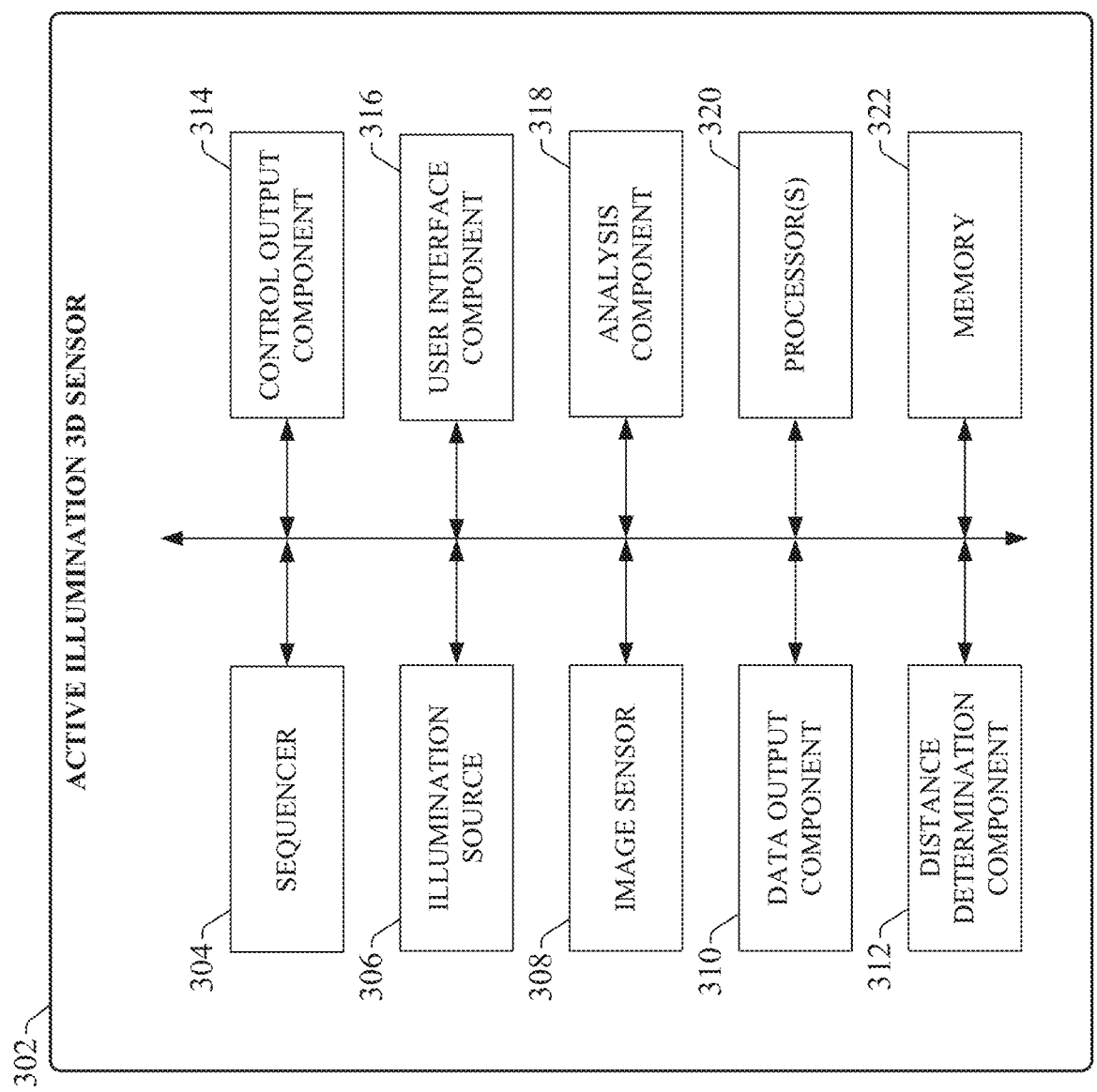
FIG. 3 is a block diagram of an example active illumination 3D safety sensor.

FIG. 3 is a block diagram of an example active illumination 3D safety sensor 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Sensor 302 can include a sequencer 304, an illumination source 306, an image sensor 308, a data output component 310, a distance determination component 312, a control output component 314, a user interface component 316, an analysis component 318, one or more processors 320, and memory 322. In various embodiments, one or more of the illumination source 306, image sensor 308, data output component 310, distance determination component 312, control output component 314, user interface component 316, analysis component 318 the one or more processors 320, and memory 322 can be electrically and/or communicatively coupled to one another to perform one or more of the functions of the sensor 302. In some embodiments, one or more of components 304, 306, 308, 310, 312, 314, 316 and 318, or portions thereof, can comprise software instructions stored on memory 322 and executed by processor(s) 320. Sensor 302 may also interact with other hardware and/or software components not depicted in FIG. 3. For example, processor(s) 320 may interact with one or more external user interface devices, such as a keyboard, a mouse, a display monitor, a touchscreen, or other such interface devices. Sensor 302 may also include network communication components and associated networking ports for sending data generated by any of components 304, 306, 308, 310, 312, 314, 316 and 318 over a network (either or both of a standard data network or a safety network), or over a backplane.

Sequencer 304 can be configured to generate trigger signals that control synchronized operation of the illumination source 306 and the image sensor 308. Illumination source 306 can be configured to emit pulsed illumination under the control of the trigger signals generated by the sequencer 304. Image sensor 308 can be configured to convert light energy incident on a photo-receiver or photo-detector array to electrical charge for respective pixels of the image sensor 308. Data output component 310 can be configured to convert the electrical signals generated by pixels of image sensor 308 to digital values. Distance determination component 312 can be configured to calculate distance values corresponding to the respective pixels of image sensor 308 based on analysis of the digital values generated by data output component 310. In the case of an example TOF sensor, distance determination component 312 can be configured to determine a propagation time (time of flight) of emitted light pulses for each pixel of the image sensor 308 based on the digital values, and to further determine a distance value of an object or surface corresponding to the pixel based on the determined propagation time.

Control output component 314 can be configured to control one or more sensor outputs based on results generated by the distance determination component 312 or the analysis component 318. This can include, for example, sending an analog or digital control signal to a control or supervisory device (e.g., an industrial controller, an on-board computer mounted in a mobile vehicle, etc.) to perform a control action, initiating a safety action (e.g., removing power from a hazardous machine, switching an industrial system to a safe operating mode, etc.), sending a feedback message to one or more plant personnel via a human-machine interface (HMI) or a personal mobile device, sending data over a safety network, or other such signaling actions. In various embodiments, control output component 314 can be configured to interface with a plant network (e.g., a control and information protocol network, and Ethernet/IP network, a safety network, etc.) and send control outputs to other devices over the network connection, or may be configured to send output signals via a direct hardwired connection.

User interface component 316 can be configured to receive user input and to render output to the user in any suitable format (e.g., visual, audio, tactile, etc.). In some embodiments, user interface component 316 can be configured to communicate with a graphical user interface (e.g., a client application, a programming or development platform, etc.) that executes on a separate hardware device (e.g., a laptop computer, tablet computer, smart phone, etc.) communicatively connected to sensor 302. In such configurations, user interface component 316 can receive input parameter data entered by the user via the graphical user interface, and deliver output data (e.g., error messages; device status, health, or configuration information; etc.) to the interface. Input parameter data can include, for example, normalized pulse shape data that can be used as reference data for identification of irregularly shaped pulses, light intensity settings, minimum safe distances or other distance threshold values to be compared with the measured distance value for the purposes of determining when to initiate a control or safety output, or other such parameters. Output data can comprise, for example, status or diagnostic information for the sensor 302, alarm or fault information, parameter settings, or other such information.

Analysis component 318 can be configured to perform analysis of diagnostic test data generated by diagnostic components of the sensor 302 in order to determine the status or health of various components of the sensor 302. The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Figure 4:
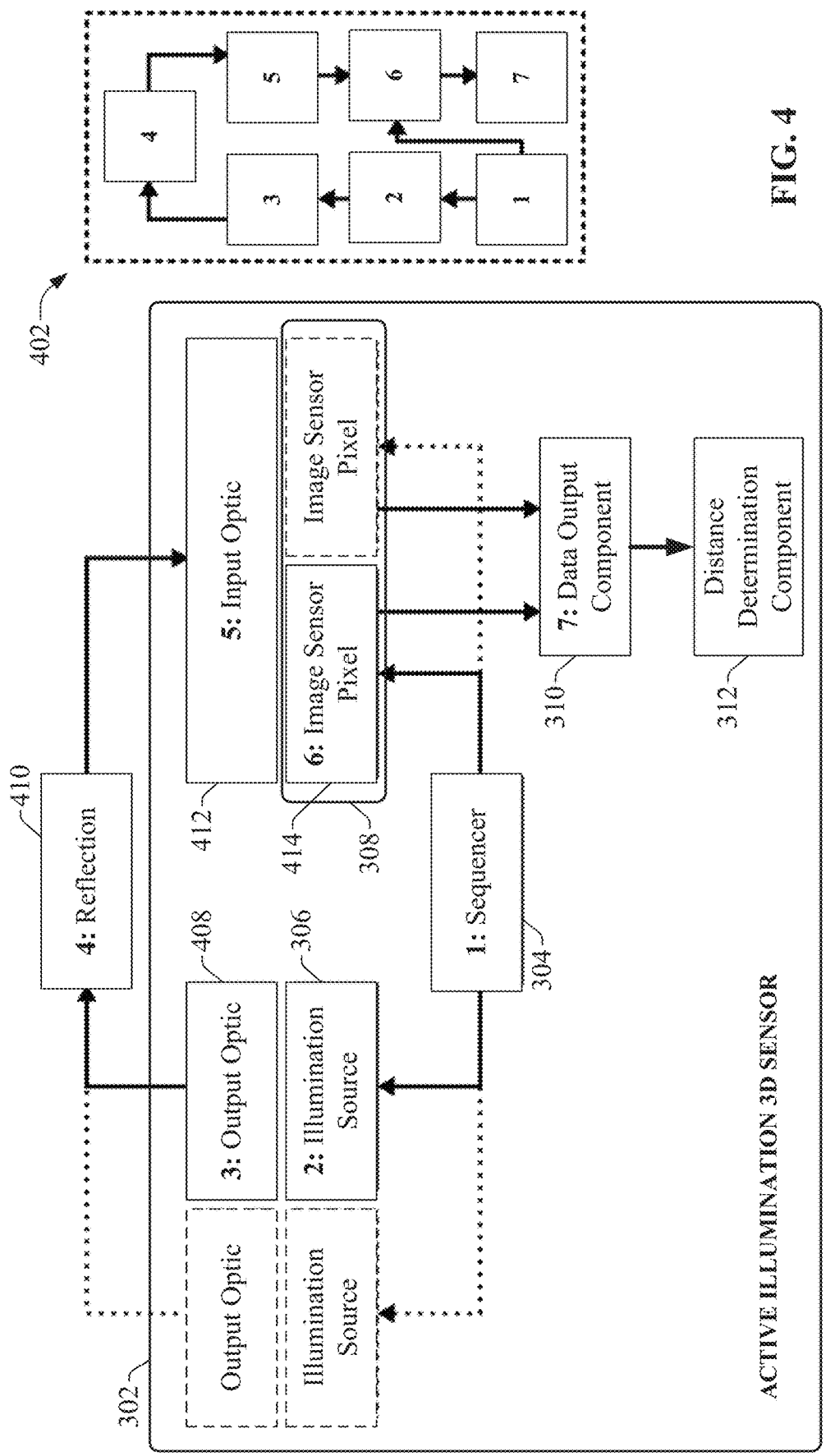
FIG. 4 is a generalized schematic of the fundamental components of a sensor and its associated sensing channel.

FIG. 4 is a generalized schematic of the fundamental components of sensor 302 and its associated sensing channel according to one or more embodiments. Although example embodiments described herein assume that sensor 302 achieves 3D sensing using an optical time-of-flight technique (as described above), the diagnostic features described herein can be applied to other types of active illumination 3D sensors, including but not limited to sensors that employ active stereo techniques.

Sensor 302 comprises one or more illumination sources 306, output optics 408, input optics 412, an image sensor 308 comprising one or more image sensor pixels 414, a sequencer 304, a data output component 310, and a distance determination component 314. Sequencer 304 is configured to synchronize the emission of light from each illumination source 306 with the exposure of the image sensor 308. Sequencer 304 provides highly accurate and precise trigger signals to the illumination sources 306 and image sensor 308 that trigger optical emission and light detection, respectively. The one or more illumination sources 306 generate the fundamental optical signal that illuminates the scene being monitored and, in the case of a TOF system, provides the optical measurement of distance. Illumination sources 306 can generate a sequence of short, high power optical pulses, and may comprise any suitable type of light source, including but not limited to light-emitting diodes (LEDs), lasers, or vertical-cavity surface-emitting laser (VCSELs).

Output optics 408 apply optical beam shaping to the light generated by illumination sources 306. In an example embodiment, output optics 408 can take, as input, the raw light output from the illumination sources 306 and perform optical beam shaping to the raw light to generate a uniform intensity field of illumination over the scene.

Reflection block 410, which is not a component of the sensor 302, represents reflection of a portion of the emitted optical beam back to the image sensor 308 by an object within the scene. While not being under the control of the system designer, reflection block 410 represents an element of the overall distance measurement channel. Objects within the scene that reflect light reflected back to the sensor 302 can vary in terms of reflectivity, specularity, and orientation, resulting in a wide range of optical signal amplitudes being returned to the image sensor 308.

Input optic 412—which may comprise one or more lenses—collects reflected optical signals from the monitored scene and focuses the received optical signals onto the image sensor 308 (comprising one or more pixels 414) in order to produce a high contrast image of the scene over the array of pixels 414. Image sensor 308 comprises an array of individual pixels 414, each pixel 414 acting as an independent light detector and producing an electrical signal proportional to the intensity of light received at the pixel 414 during a given exposure time.

Data output component 310 converts the raw analog electrical signals or photo currents generated by pixels 414 to digital values that are subsequently processed by the distance determination component 312 to determine distance values measured by each pixel 414. Distance determination component 314 can analyze the digital values to estimate total propagation times of the pulses received at the pixels 414, and translate these propagation times to estimated distances one or more objects from the respective pixels (e.g., based on equation (1) above or a variation thereof).

As illustrated by simplified block diagram 402, which depicts the flow of optical and electrical information through the components depicted in FIG. 4, these components, together with the path of light from the output optics 408 to objects in the scene and back to the input optic 312, form a single channel over which distance values are measured. A failure of any of the components in the channel—which can be represented by a removal of one of the arrows in diagram 402—would cause the overall system to fail. In terms of functional safety, without a redundant channel and without suitable diagnostics, a sensor having these components would have a Hardware Fault Tolerance (HFT) of zero (where an HFT number N indicates that the safety sensor is capable of sustaining N+1 faults without loss of the associated safety function). Depending on the value of HFT for a subsystem, relevant standards require that defined minimum Safe Failure Fractions (SFF) are met, where the SFF is defined as ratio of the sum of the rates of safe and detected dangerous failures to the sum of the rates of safe and dangerous failures. To achieve higher SIL levels, SFFs are generally required to be greater than 90%.

According to the definition of SFF, higher SFF values can be achieved by increasing the detection of dangerous failures. Typically, potential failure modes of 3D sensors are identified through formal methods such as Failure Mode and Effects Analysis (FMEA) at various stages during the system design (e.g., concept, design, etc.).

Various embodiments of sensor 302 described herein enhance one or more of the components depicted in FIGS. 3 and 4 with diagnostic capabilities that can increase the sensor's ability to detect failures of each component, thereby improving the detection reliability of the sensor 302. The diagnostic functions for each of the sensor components are described below. Although diagnostic features are described for each of the components illustrated in FIGS. 3 and 4, some embodiments of sensor 302 may not necessarily include all the diagnostic functions described herein. Rather, sensors that include any combination of one or more of the diagnostic functions described herein are within the scope of one or more embodiments.

Figure 5:
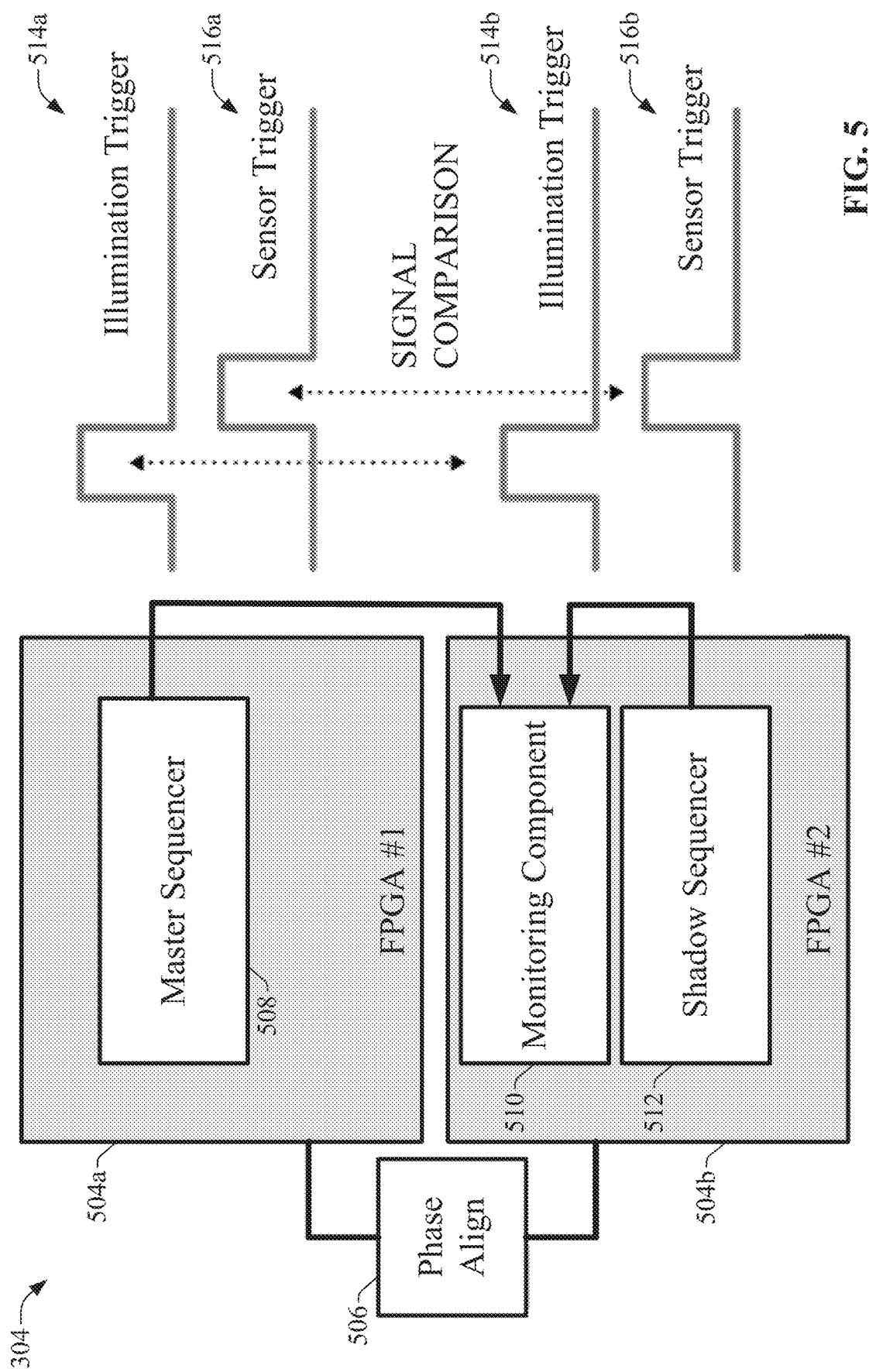
FIG. 5 is a schematic illustrating an example sequencer that includes a sequence diagnostic system capable of detecting failures of the sequencer.

As noted above, sequencer 304 generates trigger signals for both the illumination sources 306 and the image sensor 308. The accuracy and stability of these trigger signals is critical to the sensor's time-of-flight measurement. However, only one sequencer 304 can be the master for this synchronization process. FIG. 5 is a schematic illustrating an example sequencer 304 that includes a sequence diagnostic system capable of detecting failures of the sequencer 304. The diagnostic concept implemented on sequencer 304 relies on two field-programmable gate array (FPGA) devices 504a and 504b (or embedded logic devices of another type, such as microprocessors or microcontrollers) that are part of sequencer 304. A first FPGA device 504a contains a master sequencer 508 that triggers the illumination trigger signal 514a and the sensor trigger signal 516a. Master sequencer 508 is a hardware implementation that generates the illumination trigger signal 514a that controls burst sequences of illumination pulses by the illumination sources 306 as well as the sensor trigger signal 516a that controls operation of the image sensor 308 (comprising pixels 414).

A second, separate FPGA device 504b contains an identical implementation of the master sequencer 508 referred to as a shadow sequencer 512. Shadow sequencer 512 operates synchronously with the master sequencer 508, generating a shadow illumination signal 514b having the same timing as illumination trigger signal 514a, and a shadow sensor signal 516b having the same timing as sensor trigger signal 516a. The two FPGA devices 504a and 504b are phase aligned (e.g., using a phase alignment component 506).

A monitoring component 510 of the second FPGA device 504b compares the output of the master sequencer 508 with the output of the shadow sequencer 512. That is, the monitoring component 510 compares characteristics of the illumination trigger signal 514a with corresponding characteristics of the shadow illumination signal 514b, and compares characteristics of the sensor trigger signal 516a with corresponding characteristics of the shadow sensor signal 516b. Signal characteristics compared by monitoring component 510 can include, but are not limited to, signal timings, pulse widths, slew rates, overshoot, undershoot, and stability. Mismatches in any of these characteristics between a trigger signal and its corresponding shadow signal can cause an invalid range measurement. Accordingly, monitoring component 510 monitors for deviations of one or more characteristics (e.g., timing, pulse width, slew rates, etc.) in excess of a defined tolerance. If such a deviation is detected, monitoring component 510 can initiate an error message, a diagnostic countermeasure, and/or a safety action. For example, in response to detection of a mismatch between a trigger signal and its corresponding shadow signal by monitoring component 510, monitoring component 510 can instruct control output component 314 to generate a safety output signal that disconnects power from a protected industrial machine, stops operation of the machine, or causes the machine to enter a safe operating mode (e.g., a slow operating mode). Monitoring component 510 can also instruct user interface component 316 to render a suitable diagnostic fault or error message (e.g., an Incorrect Timing Signals message). Detected deviations or mismatches between trigger signals and their corresponding shadow signals can also be indicative of device aging over the sensor lifetime.

Although the example trigger signals illustrated in FIG. 5 depict only a single sensor trigger signal 516a (and corresponding shadow signal 516b), some embodiments of sequencer 304 may be configured to generate more than one sensor trigger signal 516a per pixel for a given pulse measuring sequence, depending on the pixel configuration. For example, if each pixel comprises three measuring capacitors used to capture three sets of data for each pulse during a single measuring sequence (as will be described below in connection with FIG. 9), sequencer 304 may generate a separate trigger signal 516 for each of the three measuring capacitors.

Illumination source 306 can also include a number of diagnostic features that improve sensor reliability. FIG. 6 is a top view and a side view of an example illumination source 306 that includes integrated diagnostic features according to one or more embodiments. This example illumination source 306 comprises three laser sources 602a, 602b, and 602c connected in series, and a driver chip 604 that controls the power source 608 from the high voltage line (VCC). Although the present example depicts laser sources as the source of illumination, other types of illumination sources (e.g., LEDs, VCSELS, etc.) are also within the scope of one or more embodiments. The driver chip 604 controls the power source 608 to provide short, precisely defined current pulses to the series array of laser sources 602. The electrical power contained within these current pulses is linearly converted to output optical pulses by the laser sources 602 with a certain efficiency. The resulting pulsed light is provided to the output optic 408, which shapes the received rays to yield emitted illumination 620 used for distance measurement purposes.

The output optical pulses generated by laser sources 602 are susceptible to potential changes in pulse shape due to thermal deviations, degradation of the illumination source 306 over time, or other such causes. To address this issue, a monitor photodiode (PD) 614 monitors the optical output of the laser sources 602 and provides feedback to the driver chip 604 regarding the optical output power of the laser sources 602. In the example illustrated in FIG. 6, a single monitor photodiode 614 is incorporated into the electronic circuit (embodied on PCB 616) in close proximity to the array of laser sources 602. Monitor photodiode 614 performs primary detection of the optical emission by measuring a portion of back-reflection 626 of the emitted light reflected from the surfaces of the output optic 408. Even if the output optic 408 is coated with anti-refection coating, the output optic 408 will provide a sufficient back-reflected optical signal to ensure a measurement by the photodiode 614 with acceptable signal-to-noise ratios (SNRs). The primary back-reflection 626 is from the first output optical surface 622 on which light from the laser sources 602 is incident (the output optical surface 622 facing the laser sources 602). This first output optical surface 622 is protected from material damage by the remainder of the output optic 408 and any external windows incorporated into the sensor 302 itself. The monitoring photodiode 614 is oriented to capture a sufficient amount of back-reflection 626 to obtain a reliable optical power measurement.

Monitoring photodiode 614 measures the average optical power of the back-reflection 626 over a burst sequence of pulses with a time period defined by the time-constant of the analog circuit and generates a feedback signal to the driver circuit 604 indicative of the average optical power. Driver chip 604 regulates the shape of the current pulses through the laser sources 602 based on this feedback from the monitor photodiode 614. For example, the driver chip 604 (or another analytic component of the sensor, such as analysis component 318) can determine whether the measured average optical power value reported by the feedback signal from the monitoring photodiode 614 is within a range of factory-defined or user-defined limits. If the measured average optical output is found to be outside the defined limits based on the comparison, driver chip 604 can adjust the amplitude or width of the current pulses through the laser sources to compensate for this deviation. If the optical output power deviates from the defined limits by a degree that cannot be compensated for by adjustments to the current pulses, the user interface component 316 can generate a diagnostic fault or error message (e.g., "Incorrect Optical Pulse Width," "Incorrect or Zero Intensity Emission," etc.). Control output component 314 may also initiate a safety action (e.g., generation of a control signal that disconnects power from a machine or places the machine in a safe operating mode) in response to an excessive deviation in average optical signal power. In some embodiments, sensor 302 may automatically adjust the defined average optical power limit over time in a predefined manner to allow for sensor aging or accumulated sensor operating hours.

In some embodiments, in addition to or as an alternative to monitoring the average optical power of the back-reflection 626, monitoring photodiode 614 may measure individual or average optical pulse shape and/or amplitude of the back-reflected pulses, and the feedback signal to the driver circuit 604 can indicate this individual or average pulse shape and/or amplitude. In such embodiments, driver chip 604 can regulate the shape and/or amplitude of the current pulses through the laser sources 602 based on this feedback signal to ensure that the shape or amplitude of the output pulses remains within defined ranges.

Illumination source 306 can also include other components that provide fault detection and diagnostic capability. For example, a current sense system 610 can be incorporated in the analog drive circuitry in some embodiments. This sense system 610 monitors three aspects of the current pulses being passed through the laser devices 602 from the power source 608—pulse amplitude, pulse timing, and pulse shape. Sense system 610 can compare the measured values of these aspects of the current pulses with a defined tolerance range defined for each of the monitored aspects. Incorrect current pulse widths, amplitudes, or timings detected by sense system 610 may be caused by a fault with the driver chip 604 or the sequencer 304, and may result in incorrect or degraded range measurements and could, in some cases, have an impact on the eye-safety of the sensor. In response to detecting a deviation of any of these aspects of the current pulses from their defined safe ranges, sense system 610 can instruct user interface component 316 to generate an a diagnostic fault or error message (e.g., "Incorrect Current Pulse Width," "Incorrect Current Pulse Amplitude," etc.) and, in some embodiments, may instruct control output component 314 to initiate a safety action (e.g., disconnection of power from a hazardous machine, placing the machine in a safe mode, etc.).

In addition, an optical bandpass filter 612 is incorporated in the optical path ahead of the monitor photodiode 614 to facilitate detection of unforeseen changes in wavelength of the optical signal emitted by laser devices 602. Such changes in wavelength may be caused by thermal changes, external optical interference, or general degradation over the sensor's lifetime. Bandpass filter 612 is similar in terms of transmission characteristics to the bandpass filter contained within the image sensor 308. That is, the passband of bandpass filter 612 is the same as the passband of the bandpass filter of the image sensor 308, which permits optical signals within a defined range of frequencies to pass on to the image sensor 308. Thus, bandpass filter 612 mimics the behavior of the optical received path (comprising input optic 412 and image sensor 308), allowing monitor photodiode 614 to detect a failure in emission of the correct wavelength. Specifically, if the wavelength of light emitted by laser sources 602 moves outside the spectral range of the input bandpass filter of the image sensor 308 (which is also the passband of bandpass filter 612), bandpass filter 612 prevents the monitored optical signal from reaching the monitor photodiode 614, and the resulting loss of signal from the photodiode 614 is detected by analysis component 318. In response to detecting this loss of signal, analysis component 318 can instruct user interface component 316 to generate a diagnostic fault or error message (e.g., "Incorrect Emission Wavelength," "Incorrect or Zero Intensity Emission," etc.) and instruct the control output component 314 to initiate a safety action.

In the absence of bandpass filter 612, unforeseen changes in the wavelength of light emitted by laser sources 602 that cause the wavelength to move outside the spectral range of the input bandpass filter of the image sensor 308 would continue to be emitted to the viewing scene but would not be received by the image sensor 308 due to the image sensor's input bandpass filter, resulting in a measurement failure.

Some embodiments of illumination source 306 can also include a temperature sensor 606 contained within the electronic circuit of the illumination system. Temperature sensor 606 continuously monitors the temperature of the illumination system 306 during each operational cycle and compares the measured temperature with a defined temperature limit. In response to detecting that the measured temperature exceeds the defined limit, temperature sensor 606 can instruct user interface component 316 to generate a diagnostic fault or error message and, in some embodiments, instruct control output component 314 to initiate a safety action.

Figure 7:
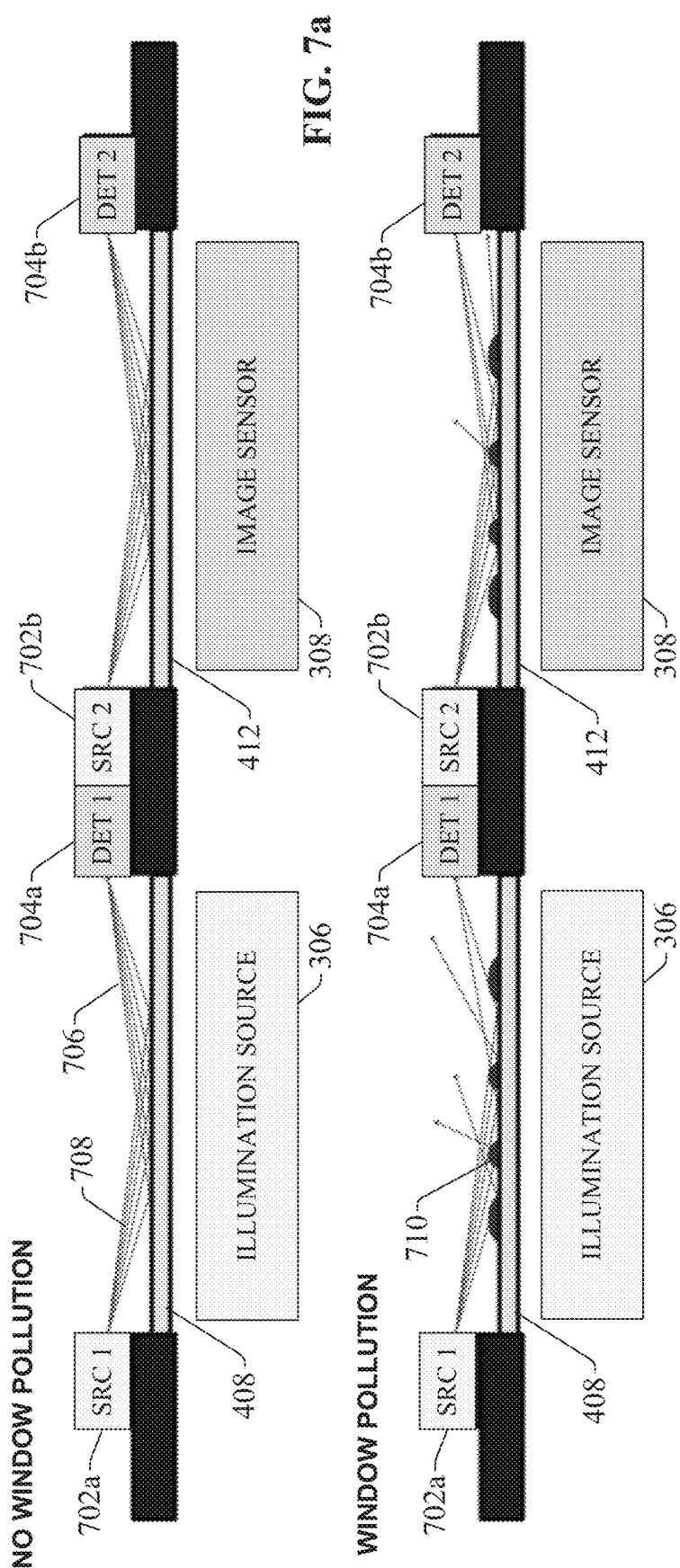
FIG. 7a is a side view of an output optic, an input optic, an illumination source, an image sensor, and associated diagnostic components for a scenario in which there is no pollution on the input and output optics.
FIG. 7b is a side view of the output optic, the input optic, the illumination source, the image sensor, and associated diagnostic components for a scenario in which pollution is present on the input and output optics.

As illustrated in FIG. 4, both the illumination sources 306 and the image sensor 308 are arranged behind optical systems; namely, the output optic 408 and input optic 412, respectively. Output optic 408 directs and shapes the light emitted from the illumination sources 306 to the scene being monitored, and the input optic 412 collects the reflected light from the scene and focuses the light onto the image sensor 308. One or more embodiments of sensor 302 can include diagnostic features that detect failure modes of the input optic 412 and output optic 408 that may result in detection failures due to improper illumination or collection of light. FIGS. 7*a* and 7*b* are side views of the output optic 408, input optic 412, an illumination source 306, the image sensor 308 (the array of pixels 414), and associated diagnostic components. In this example it is assumed that any additional protective windows are included in the optical system. In general, the optical system diagnostics verify that the external optical surfaces of input optic 412 and output optic 408 are free from damage, dirt, and pollution.

In this example diagnostic technique uses source-detector pairs arranged around each external optical window. In the example depicted in FIG. 7*a*, a diagnostic illumination source 702*a* is mounted near one side of the external optical window of output optic 408, behind which illumination source 306 resides. A corresponding detector 704*a* is mounted near the opposite side of external optical window facing the illumination source 702. Similarly, a second diagnostic illumination source 702*b* is mounted near one side of the external optical window of input optic 412, behind which image sensor 308 resides. A corresponding detector 704b is mounted near the opposite side of the external optic window facing the illumination source 702b. The diagnostic illumination sources 702a and 702b are oriented such that light 708 emitted by each illumination source 702 is directed across the external surface of the window at a glancing or total reflection angle relative to the external surface. The emitted light 708 is reflected off the surface of its corresponding optic window and a portion of the reflected light is received by its complementary detector 704 as reflected light 706. Each detector 704 is configured to measure the amplitude of the reflected light 706 received at the detector 704. FIG. 7a depicts a scenario in which the external optical windows of the output optic 408 and input optic 412 are clean and free of pollutants or mechanical damage. In the absence such abnormalities, the reflected light 706 is received at the detector 704 with a predictable amplitude and from a predictable direction.

The amplitude and direction of the reflected light 706 is sensitive to changes in the properties of the external surfaces of input optic 408 and output optic 412. FIG. 7b depicts a scenario in which the external optical windows of the output optic 408 and input optic 412 are contaminated with particulates 710 (e.g., dirt particles, dust, oil, etc.). Optical changes to the external surfaces of output optic 408 and input optic 412 due to the presence of particulates 710 will generate deviations in the amplitude and/or direction of the reflected light 706 that are detectable by the detectors 704. Causes of such optical changes can include, for example, condensation; dust particulates; scratches or mechanical damage; transmission changes due to ageing, crystallization, or frosting; dirt or oil contamination; or other such abnormalities.

Detectors 704 can monitor for deviations in the amplitude of the received reflected light 706 and determine whether the measured amplitude and/or direction deviate outside defined limits, indicating a change in the external surface properties that may result in improper illumination (if the changes are introduced on the surface of the output optic 408) or improper light collection (if the changes are introduced on the surface of the input optic 412). In response to detecting such deviations, the relevant detector 704 can instruct user interface component 316 to generate an appropriate diagnostic fault or error message (e.g., "Incorrect Illumination of Scene," "Incorrect Collection of Light from Scene," "Reduced or Zero Emission," "Reduced or Zero Light Collection," "Dangerous laser Illumination Power," etc.), and in some embodiments may instruct control output component 314 to initiate a safety action. Also, in some embodiments, sensor 302 may be configured to initiate a diagnostic countermeasure in response to detecting a deviation in the amplitude or direction of reflected light 706. Such countermeasures may include, for example, initiation of an automated optic cleaning system that removes foreign bodies from the optical surfaces, increasing the intensity of the light emitted by the illumination source 306 to compensate for the presence of pollution on the output optic 408, increasing an exposure time of the image sensor 308 to compensate for the presence of pollution on the input optic 412, or other such diagnostic countermeasures.

The measured amplitude of the reflected light 706 is also susceptible to changes due to turbid or scattering ambient conditions around the sensor 302, such as fog, mist, or steam. Since detectors 704 will detect changes in the reflected light 706 due to such environmental conditions, this approach also provides environmental diagnostics for scenarios in which the sensor 302 is operated in a turbid or scattering media.

In some embodiments, multiple pairs of diagnostic illumination sources 702 and detectors 704 may be used to provide sufficient coverage of the entire optical window. In other embodiments, one or more illumination sources 702 may provide light for detection by an array of detectors 704. In some such embodiments, the array of detectors 704 may comprise a linear photodiode array that provides additional data for detection, analysis, and discrimination of contaminants. For example, multiple detectors 704 can be used to discriminate both scattered intensity as well as direction of scattering. In some cases, the intensity and direction of scattering can be a predictable function of certain types of contaminant, and so the measured scattering intensity and direction can provide additional diagnostic information to the user that may be leveraged to identify the type of contaminant on the optic. In an example implementation, the system can detect scattering intensity and direction based on the differential between output signals of two of the multiple detectors 704. In another example implementation, some of the detectors 704 may be oriented to detect scattered light from the one or more illumination sources 702, while other detectors 704—referred to as reference detectors—are oriented to measure ambient light in proximity of the sensor. The ambient light measurement data from the reference detectors 704 may be used to correct the signals generated by the other detectors 704 used to measure scattering by factoring out the ambient light component from the detector measurements.

Figure 8:
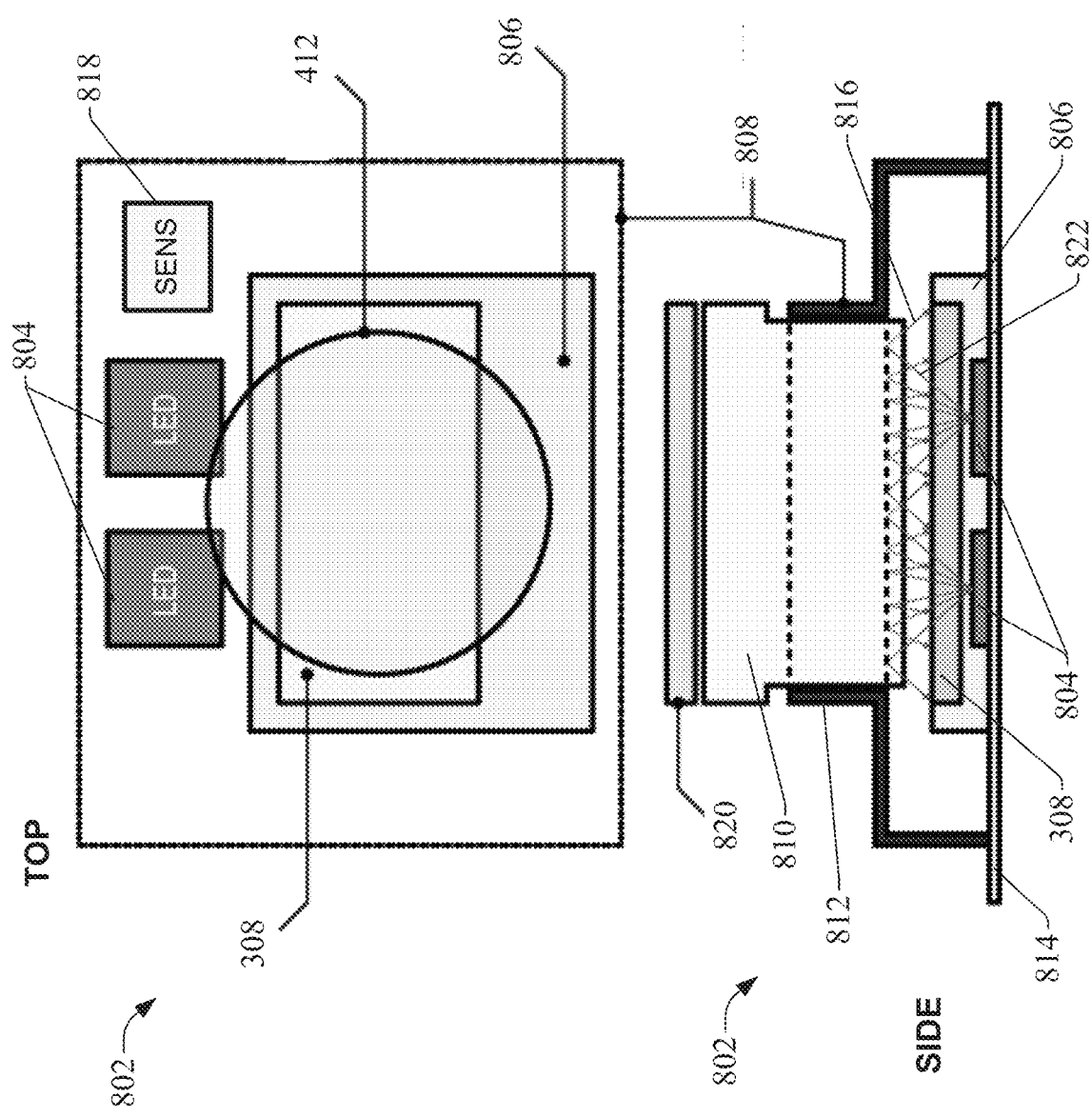
FIG. 8 is a top view and a side view of an example image sensor assembly that includes an image sensor and a number of diagnostic components.

Image sensor 308 can also include diagnostic features that verify correct timing and synchronization, correct exposure times, correct response to light, correct accumulation behavior, and pixel-to-pixel independence. FIG. 8 is a top view and a side view of an example image sensor assembly that includes the image sensor 308 and a number of diagnostic components. The image sensor 308 (comprising an array of pixels 414; see FIG. 4) is contained on an image sensor package 806, which itself is contained within an opaque housing 808 that incorporates a lens screw mount 812. A lens 810 (which may be part of input optic 412) is mounted in the lens screw mount 812 above the image sensor 308 at a distance that provides sufficient focus and image contrast. Lens 810 serves to focus incoming light—including portions of the pulsed optical signal emitted by illumination sources 306 and reflected back to the lens 810 by surfaces in the monitored area—onto the image sensor 308. An optical bandpass filter 820 is incorporated within the input optical path. In the example depicted in FIG. 8, bandpass filter 820 is mounted before the input lens 810. However, in some embodiments bandpass filter 820 may be installed behind lens 810 or incorporated into the lens assembly itself.

Two additional LEDs 804, referred to as auxiliary LEDs, are mounted in proximity to the pixel array contained within the image sensor 308. Although the example system described herein employs LEDs as the source of auxiliary illumination, other types of auxiliary light sources can be used, including but not limited to laser diodes or VCSELs. Auxiliary LEDs 804 are oriented to project auxiliary optical light pulses 822 such that at least a portion of the auxiliary pulses 822 reflect from an inner surface of the housing 808 as reflected pulses 816 directed back to the image sensor 308. These auxiliary LEDs 804 are driven (e.g., by auxiliary illumination trigger signals generated by sequencer 304) to provide optical pulses similar in pulse width and pulse shape to the actual measurement optical pulses generated by the illumination source 306. In various embodiments, sensor 302 can operate a diagnostic cycle after each normal measurement cycle carried out by the image sensor 308, or may operate the diagnostic cycle on a periodic time basis or according to a defined schedule. During this diagnostic cycle, sequencer 304 drives the LEDs 804 with a pre-defined pulse burst sequence. The emitted light 822 is reflected from within the inner surfaces of the housing 808 and at least a portion of the reflected light pulses 816 are incident on the pixels 414 of image sensor 308. By controlling LEDs 804 to effect various timings and amplitudes of emission, a distance measurement operation of the image sensor 308 can be reproduced or simulated in a single diagnostic cycle.

Each LED 804 can be driven independently from the other in some embodiments. Diagnostic circuitry (e.g., on PCB or chip 814) can incorporate a current sense monitor 818 similar to current sense system 610, which is configured to measure: a) pulse amplitude, b) pulse timing, and c) pulse shape of current pulses that drive the LEDs 804.

In general, an optical time-of-flight measurement requires a determination of the round-trip time for an optical pulse to travel from the illumination source 306 to the object being measured and back to a pixel 414 of the image sensor 308. Under the assumption that the speed of light is constant, the pulse's round-trip time is directly proportional to the distance of the object from the sensor 302. In some time-of-flight approaches, a short optical pulse can be emitted by the illumination source 306 and three distinct measurements can be made by the image sensor 308 that characterize the time (relative to pulse emission) at which the reflected pulse is received at the pixel 414. These three measurements are taken at three different timings and correspond to three separate exposures of the pixel. Depending on the number of measuring capacitors associated with each pixel 414, these three exposures can be captured from three separate pulse bursts using respective three different exposure timings (if only one measuring capacitor is used), or may all be captured from a single pulse burst using three separate gatings of the same pixel (if three measuring capacitors are used).

Figure 9:
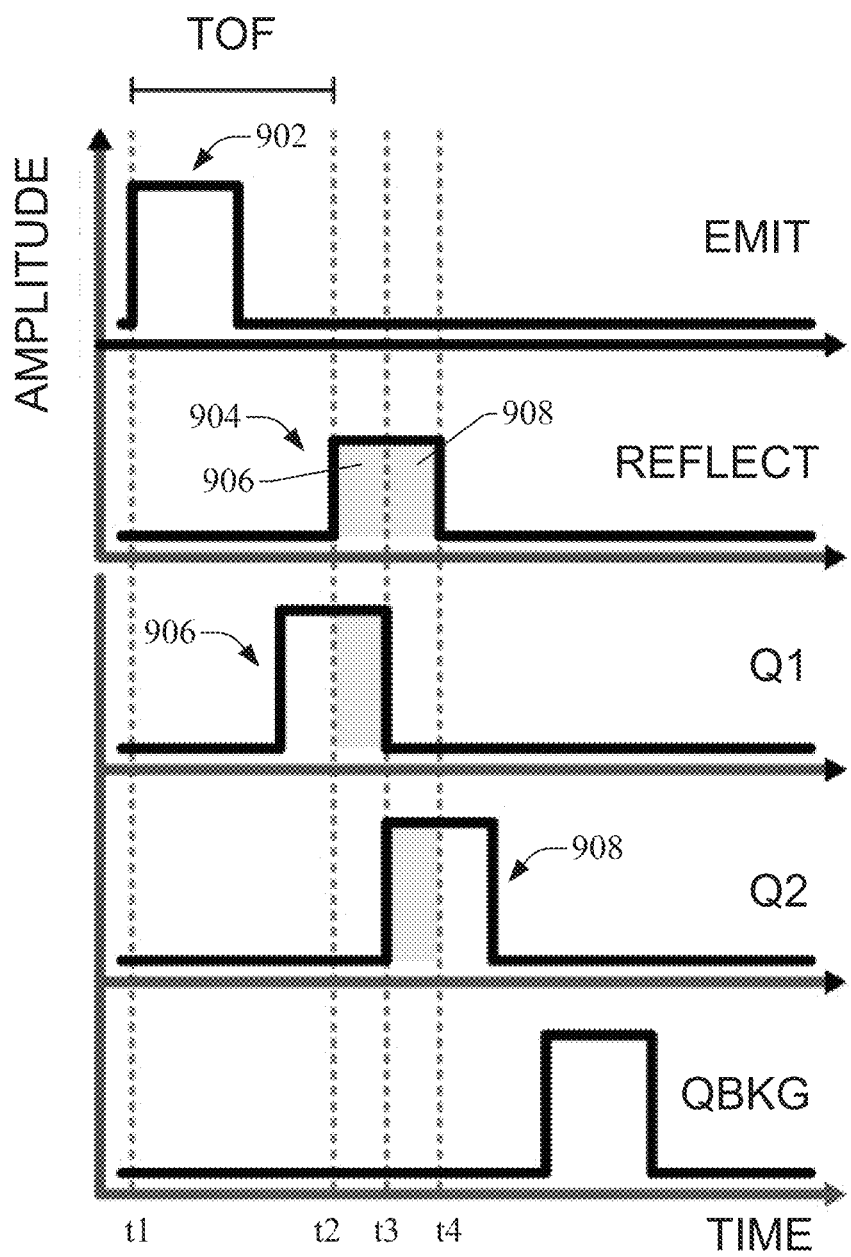
FIG. 9 is a timing diagram illustrating timing relationships for an example distance measuring sequence.

FIG. 9 is a timing diagram illustrating timing relationships for an example distance measuring sequence that uses three measuring capacitors per pixel. The timings of the illumination source 306 (represented by the EMIT graph) and the pixel exposures of the image sensor 308 (represented by the Q1, Q2, and QBKG graphs) can be controlled by the trigger signals generated by the sequencer 304, which is subject to its own diagnostic checks as discussed above in connection with FIG. 5. Beginning at time t1, a pulse 902 is emitted by illumination source 306. The emitted pulse 902 reflects from an object in the monitored scene, and the reflected pulse 904 is received at a pixel 414 starting at time t2. The difference between time t1 and time t2 represents the time of flight, or propagation time, of the pulse. The distance of the object can be calculated based on this propagation time.

Gating signals Q1 and Q2 represent gating signals that capture leading and trailing portions, respectively, of the received reflected pulse as separate voltage measurements. For example, gating signals Q1 and Q2 may control the flow of electrical charge from the pixel to respective first and second measuring capacitors, where the electrical charge is proportional to the amount of light incident on the pixel. The time between emission of pulse 902 and pulsing of the first gating signal Q1 is the same for all measuring cycles. Gating signal Q1 remains on for a defined duration. Since gating signal Q1 is on while the leading edge of the reflected pulse 904 is received, the first measuring capacitor associated with gating signal Q1 stores a first voltage proportional to the leading edge portion 906 of the reflected pulse 904. When gating signal Q1 has been set for a defined duration, Q1 goes low and the second gating signal Q2 is set at time t3. The second gating signal Q2 remains high for the same duration of time as Q1, causing the corresponding second measuring capacitor to store a second voltage proportional to the remaining portion (that is, the trailing portion 908) of the reflected pulse 904. Gating signal Q2 goes low after Q2 has been on for the same duration as Q1.

The time t3 at which Q1 goes low and Q2 goes high is referred to as the sampling point, and the location on the reflected pulse 904 at which this sampling point occurs—that is, the location of the dividing line between the leading edge portion 906 and the trailing edge portion 908—is a function of the time at which the reflected pulse 904 is received at the pixel 414 relative to the time that pulse 902 was emitted. The time that the reflected pulse 904 is received is a function of the propagation time of the pulse, which is itself a function of the distance of the object from which the pulse is reflected. As such, the relative values of the leading edge portion 906 and the trailing edge portion 908 captured by the Q1 and Q2 gating signals are likewise a function of the time at which the reflected pulse 904 is received at the pixel 414. Consequently, distance determination component 312 can calculate the propagation time based on the relative magnitudes of the captured leading and trailing edge portions of the received pulse 904.

In order to compensate for the effects of ambient light incident on the pixel 414, a third gating signal QBKG having the same duration as Q1 and Q2 can be triggered during a time when no reflected pulses are being received. This QBKG gating signal captures a voltage proportional to the amount of ambient (or background) illumination on the pixel 414, which can be subtracted from the voltages captured by the Q1 and Q2 gating signals to yield voltage values that are representative of only the received pulse portions without the effects of ambient light, rendering the propagation time calculation more accurate. Distance determination component 312 can calculate the propagation time based on analysis of the three captured voltages (converted to digital values by data output component 310), and convert this propagation time to a corresponding distance value for the pixel 414.

In the example sequence depicted in FIG. 9, the QBKG signal is triggered a short duration of time after the second gating signal Q2 has turned off, under the assumption that the reflected pulse 904 has been fully received by this time. In some embodiments, the QBKG signal may instead be triggered before the pulse 902 is emitted by the illumination source 306. In still other embodiments, in order to allow for a greater range of distance measurement, the third gating signal QBKG can be set at the same time that the second gating signal Q2 is turned off, yielding three staggered gatings that are adjacent in time. In such embodiments, with the pulse widths of the gating signals set to be equal to the pulse width of the emitted pulse 902, it can be assumed that the portions of the reflected pulse 904 will be captured by two of the three gatings. For shorter distances, the received pulse 904 will be captured by the Q1 and Q2 gatings (as illustrated in FIG. 9). For longer distances, which cause the reflected pulse to be received later in time, the received pulse 904 will be captured by the Q2 and QBKG gatings, with the Q1 gating capturing ambient light. For a given measuring sequence, the distance determination component 312 can determine which of the three captured voltage values corresponds to ambient light by comparing the magnitudes of the three voltages (assuming that the smallest voltage represents ambient light), and identifying the other two voltages as those corresponding to the leading and trailing edge portions 906 and 908 of the received pulse. Distance determination component 312 can then calculate the propagation time and distance based on analysis of these identified values.

The measurement sequence described above in connection with FIG. 9 is only intended to be exemplary, and it is to be appreciated that other approaches for measuring the distance of objects within the sensor's field of view are within the scope of one or more embodiments.

Image sensor assembly 802 is a complex sub-assembly, performing optical-electrical conversion for each pixel 414, sequencing of exposures, readout of analog values, and analog-to-digital conversion. The present image sensor diagnostic concept uses auxiliary LEDs 804 to generate a known or expected set of raw outputs corresponding to the three signals and checks that these raw outputs produce the expected result.

Returning to FIG. 8, some embodiments of sensor 302 can carry out a simple diagnostic test by instructing the LEDs 804 to emit optical pulses and instructing image sensor 308 to measure received pulses 816 that are reflected from within the inner surfaces of the housing 808. During this diagnostic test, sequencer 304 controls an amount of delay between emission of each auxiliary pulse and exposure of the pixels 414 of the image sensor 308 to simulate a propagation time corresponding to a defined object distance. After image sensor 308 has obtained measurements of the received pulses 816 (e.g., using the technique described above in connection with FIG. 9 or using another TOF measurement technique), distance determination component 312 calculates distance values for each pixel being tested based on the measurements, and analysis component 318 compares these calculated distance values with the defined distance (that is, the simulated distance corresponding to the delay between pulse emission by LEDs 804 and exposure of the image sensor 308). If analysis component 318 determines that the calculated distance for any of the pixels deviates from the expected distance in excess of a defined tolerance, the pixel is assumed to be performing faulty measurements and user interface component 316 is instructed to generate a diagnostic fault or error message. In some embodiments analysis component 318 may also disable—or tag as invalid—the faulty pixel so that the pixel does not participate in subsequent distance measurements during normal operation of the sensor 302. If the number of faulty pixels exceeds a maximum allowed number of faulty pixels, control output 314 component may be instruction to initiate a safety action (e.g., disconnection of power for a hazardous machine, placement of the machine in a safe operating mode, etc.). This diagnostic test sequence can be performed periodically during operation of sensor 302 between normal measuring sequences.

In some embodiments, sensor 302 can be configured to perform multiple test measurements during a given diagnostic sequence, adjusting the delay between pulse emission by LEDs 804 and exposure of the image sensor 308 for each test measurement in order to simulate a range of different distances. Increasing the delay between pulse emission and image sensor exposure corresponds to an increased simulated distance. Based on analysis of the measurement results for each simulated distance, sensor 302 can further characterize inaccurate measurements for a given pixel.

Some embodiments of sensor 302 can use this architecture to perform more sophisticated diagnostics of the image sensor 308. In general, correct operation of image sensor 308 depends on the following operational characteristics, which can be verified through analysis of the output data from image sensor 308 when stimulated by the auxiliary illumination: correct timing and synchronization, correct exposure times, correct response to light, correct accumulation behavior, and pixel-to-pixel independence. The integrity of these characteristics can be confirmed using diagnostic tests that utilize auxiliary LEDs 804, as described below.

Correct timing and synchronization refers to synchronization of the exposure of the image sensor 308 with pulsed emission by the illumination source 306. This timing can depend on the approach used by the sensor 302 to carry out distance measurements. The present example assumes that sensor 302 is a TOF sensor in which each pixel 414 of the image sensor 308 comprises three measuring capacitors that are controlled with a timing similar to that described above in connection with FIG. 9, in which the three measuring pixels are gated using three staggered trigger signals that are adjacent in time. In such embodiments, the timing between emission of pulse 902 by the illumination source 306 and the triggering of the first gating signal Q1, as well as the timings between the three gating signals, should be consistent for all measuring sequences during normal operation. Although these timings are controlled by sequencer 304, which is subject to its own diagnostic tests in some embodiments (as discussed above in connection with FIG. 5), the illumination source 306 and image sensor 308 may nevertheless be susceptible to synchronization errors due to factors that are independent of the sequencer 304 (e.g., aging of the sensor 302 or a fault of the image sensor 308 itself), or due to undetected issues with sequencer 304 (particularly in embodiments that do not include sequencer diagnostics).

Figures 10A, 10B:
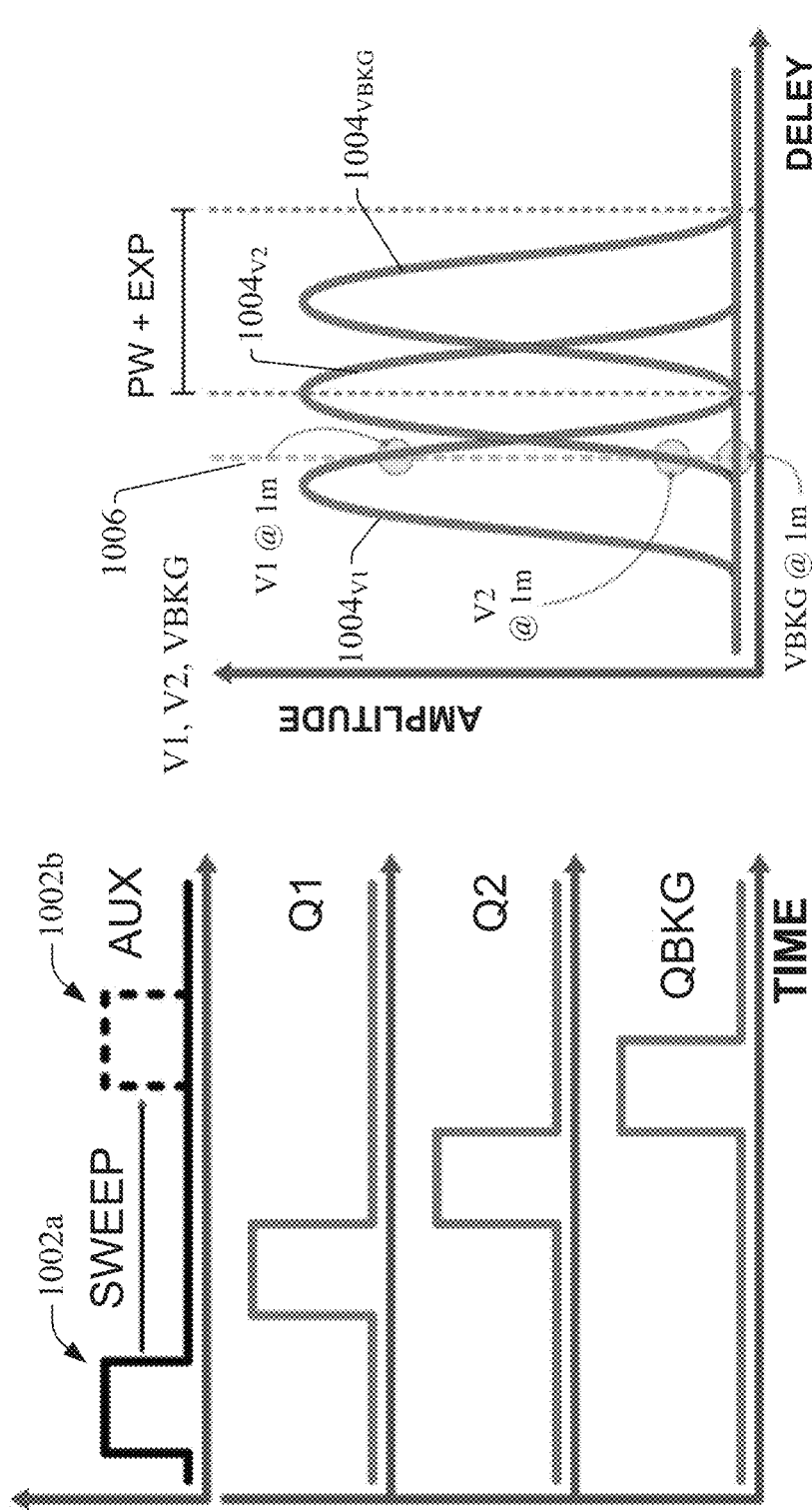
FIG. 10a is a timing chart illustrating an example diagnostic test that can be carried out using auxiliary illumination.
FIG. 10b is a plot of example characteristic curves for voltage values V1, V2, and VBKG for a pixel of an image sensor.

Accordingly, some embodiments of sensor 302 can us auxiliary LEDs 804 to perform a diagnostic test of the timing and synchronization of the illumination source 306 and image sensor 308. FIG. 10a is a timing chart illustrating an example diagnostic test that can be carried out using the auxiliary illumination provided by LEDs 804. This diagnostic test can confirm correct timing and synchronization by controlling auxiliary LEDs 804 to emit auxiliary pulses 1002 (represented by the AUX chart in FIG. 10a) during a test sequence and triggering the gating signals Q1, Q2, and QBKG to capture voltages representative of the received pulses 816 that are reflected from within the inner surfaces of the housing 808 (see FIG. 8). As described above in connection with FIG. 9, for a given pulse or burst of pulses emitted during a measuring cycle (or for a diagnostic test cycle, as in the present example), the three measuring capacitors corresponding to the Q1, Q2, and QBKG gating signals will store voltages having magnitudes that are proportional to the portion of the reflected pulse received while the corresponding gating signal was active (or proportional to ambient light if no portion of the pulse was received during that gating). For the present diagnostic test sequence, since the actual propagation time of each auxiliary pulse is substantially the same for each diagnostic test measurement (the optical path from the auxiliary LEDs 804 to the inner surface of housing 808 and back to the image sensor 308 being a constant distance), the amount of voltage stored on each measuring capacitor is a function of when the auxiliary pulse 1002 is emitted relative to the start of the gating sequence (that is, relative to the time that the first gating signal Q1 goes high). Thus, the voltages captured by the Q1, Q2, and QBKG for a given time of emission of auxiliary pulse 1002 is predictable and should remain consistent.

In order to test the validity of the internal timing of the gating signals, the diagnostic test sequence (controlled by sequencer 304) performs a multi-part test measurement sequence whereby the auxiliary LEDs 804 emit one or more auxiliary pulses 1002 at a first time relative to the gating sequence, and the gating signals are sequenced to capture the voltages corresponding to that particular auxiliary pulse emission time. The data output component 310 converts these voltages to respective values, yielding a set of three values corresponding to gating signals Q1, Q2, and QBKG, respectively, which are stored to memory 322. The voltages stored on the measuring capacitors are then cleared, and another auxiliary pulse 1002 or set of pulses 1002 are emitted at a second time relative to the gating sequence, the second time being delayed relative to the first time. The gating signals are again sequenced to capture the voltage values corresponding to this second time. This sequence continues for a set number of emission delay times and corresponding measurements, with the time of emission of the auxiliary pulse 1002 being further delayed relative to the gating sequence with each measurement. In this way, the emitted auxiliary pulse 1002 sweeps from an initial emission time (represented by solid pulse 1002a in FIG. 10a) to a final emission time (represented by dashed pulse 1002b) in delay increments, and the image sensor 308 and data output component 310 capture, for each pixel and time delay, a set of three measured voltage values V1, V2, and VBKG—corresponding to Q1, Q2, and QBKG, respectively—for each pulse emission time.

As noted above, the measured voltage values V1, V2, and VBKG captured on the measuring capacitors by the sequencing of the Q1, Q2, and QBKG gating signals are predictable for each emission delay time. Accordingly, after sets of values V1, V2, and VBKG have been collected for all delay times in the sweep, analysis component 318 can verify that the values of V1, V2, and VBKG for each emission delay time correspond to the expected values for that delay time. This check can be performed for each pixel 414 of the image sensor 308. If one or more of the values V1, V2, and VBKG for a given pixel are found to deviate from their corresponding expected values (beyond a defined tolerance) for one or more of the delay times, analysis component 318 can instruct user interface component 316 to generate a diagnostic fault or error message for the pixel (e.g., "Static Pixel," "Non-Functioning Pixel," "Incorrect Timing or Synchronization of Pixel," etc.) and/or disable the pixel such that the pixel is excluded from subsequent distance measurement sequences during normal operation. In some embodiments, analysis component may also instruct control output component 314 to initiate a safety action in response to determining that a number of faulty pixels exceeds a maximum allowable number of faulty pixels.

In some embodiments, analysis component 318 can also create a temporal sequence, for each pixel, from captured values of each of V1, V2, and VBKG as a function of the emission delay time to yield characteristic curves for the three values, which can be analyzed to verify correct internal timing of the image sensor 308. FIG. 10b illustrates a set of example characteristic curves for voltage values V1, V2, and VBKG for a pixel. When sets of values for V1, V2, and VBKG have been collected for a range of emission delays as part of a given diagnostic sequence, analysis component 318 can create a temporal sequence, for each pixel 414, the captured values of V1 as a function of the emission time delay to yield a characteristic curve $1004_{V1}$ for the pixel. Similarly, characteristic curves $1004_{V2}$ and $1004_{VBKG}$ are obtained by plotting the values of V2 and VBKG, respectively, as a function of the emission time delay. In some embodiments, in order to yield characteristic curves 1004 having a higher resolution for analytical purposes, analysis component 318 can apply a curve-fitting function to the temporal sequence of V1, V2, and VBKG values to generate a waveform that describes the data as high-resolution characteristic curves 1004. Since the values of V1, V2, and VBKG for a given time delay should be consistent and repeatable for each diagnostic test, as noted above, the values along a vertical line 1006 corresponding to a given emission delay time (e.g., 1 minute in the illustrated example) should intersect with the expected values of V1, V2, and VBKG (represented by the circles along vertical line 1006) on their respective characteristic curves 1004.

Although the example illustrated in FIGS. 10a and 10b depicts three characteristic curves being generated (corresponding to values measured on the three measuring capacitors of each pixel), some embodiments may generate other numbers of characteristic curves, according to the number of measuring capacitors used in each pixel to perform distance measurements.

Figure 11:
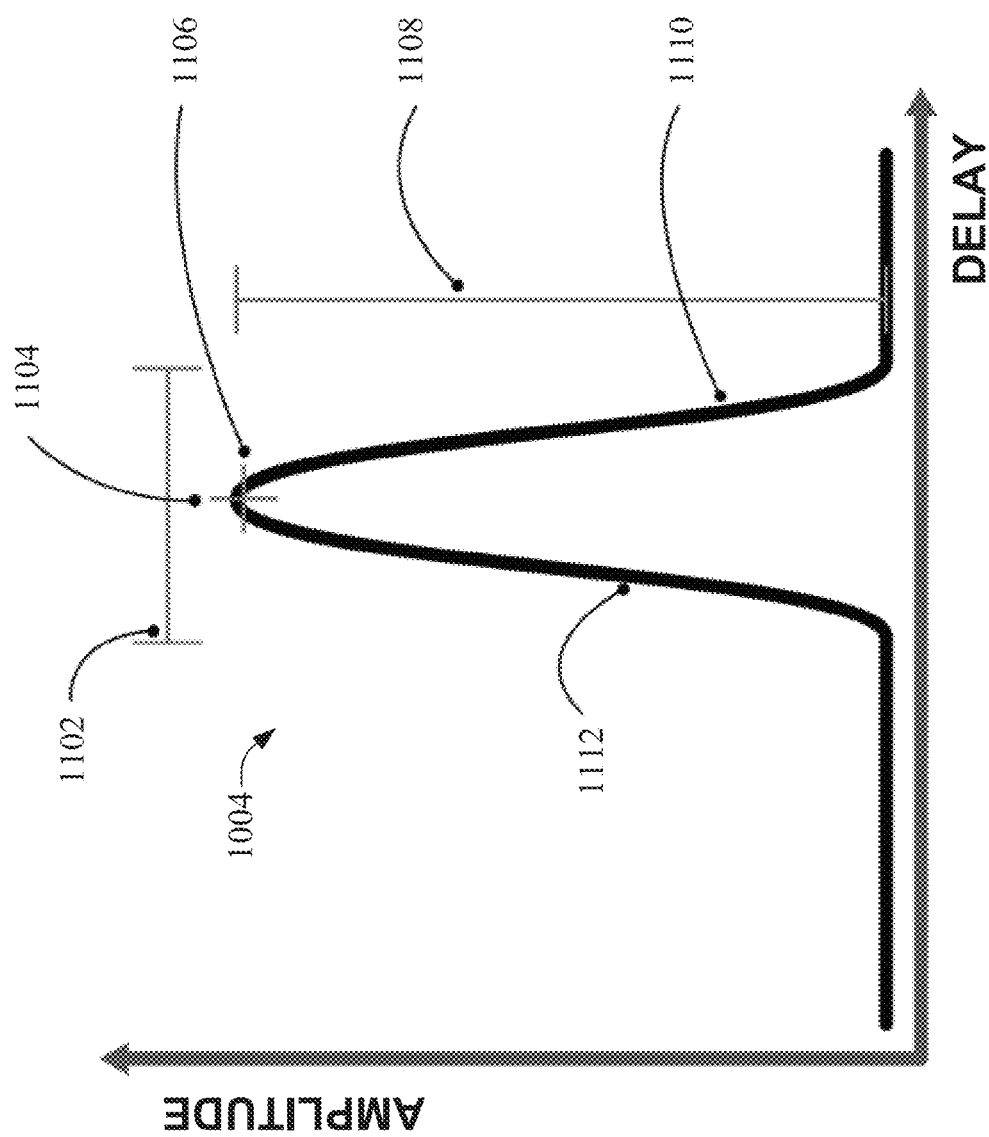
FIG. 11 is a plot of an example characteristic waveform with labels identifying properties of the waveform that can be analyzed and monitored by a waveform analysis component to identify faulty or degraded image sensor performance.

Other properties of characteristic curves 1004 may also be indicative of improper functionality of the image sensor 308. Accordingly, some embodiments of analysis component 318 can also analyze and monitor these properties for indications of pixel or image sensor health. FIG. 11 is a plot of an example characteristic waveform 1004 (for any of V1, V2, or VBKG) with labels identifying properties of the waveform 1004 that can be analyzed and monitored by analysis component 318 to identify faulty or degraded image sensor performance. For example, the position of the peak 1104 of the characteristic waveform 1004 should correspond to an expected peak position (where the expected position is defined separately for V1, V2, and VBKG curves). Waveform analysis component 318 can identify the peak positions 1104 for each of the V1, V2, and VBKG characteristic curves 1004 for each pixel, and initiate a diagnostic fault or error message, pixel disablement, and/or a safety action in response to determining that the peak position 1104 of one or more of the characteristic curves captured for a pixel deviates outside a defined threshold.

The amplitude 1108 of this peak can also be indicative of degraded performance due to aging of image sensor 308 or pixel 414. Accordingly, analysis component 318 can monitor this amplitude 1108 over multiple diagnostic sequences and initiate a diagnostic fault or error message, pixel disablement, and/or a safety action in response to determining that this peak falls outside a defined tolerance range for one or more of a pixel's characteristic curves 1004.

The width 1102 of the peak of characteristic curve 1004 is also a predictable value that, during proper operation of the image sensor 308, is approximately equal to the sum of the exposure time (that is the duration of any one of the gating signals Q1, Q2, or QBKG) and the pulse width of the emitted pulse 1002. As such, analysis component 318 can verify the correct exposure time of each pixel 414 by measuring the width 1102 of the peak of each characteristic curve 1004. The exposure times of the image sensor 308 may be very short, of a duration similar to that of the emitted optical pulses 1002. Incorrect exposure times can cause an increased influence of ambient light on the measurement, as well as potential incorrect range measurement. If analysis component 318 determines that the width of the peak of one or more of the characteristic curves 1004 for a pixel falls outside a defined acceptable range, indicating an incorrect exposure time, analysis component 318 can instruct user interface component to generate a diagnostic fault or error message (e.g., "Improper Exposure Time"), and may also disable or tag the pixel or instruct control output component 314 to initiate a safety action.

In some embodiments, analysis component 318 can also monitor the overall shape 1112 of each characteristic waveform 1004. Deviations in the shape 1112 can be indicative of changes in the image sensor's behavior due to aging of the sensor 302. Accordingly, some embodiments of analysis component 318 can be configured to store baseline profile data describing a baseline shape of the characteristic waveform 1004, and compare this baseline profile data with a measured shape of the waveform 1004 as part of the diagnostic test of the image sensor 308. In response to determining that the shape of the measured waveform 1004 deviates from the baseline shape defined by the baseline profile data, the analysis component 318 can instruct user interface component 316 to generate a diagnostic fault or error message, and may also disable or tag the pixel and/or instruct control output component 314 to initiate a safety action.

The amplitude range 1108 of the characteristic waveform 1004 is also indicative of the full dynamic range of the image sensor 308. Typically, the detection capabilities of the image sensor 308 are rated for a particular dynamic range, which can be verified based on the amplitude 1108 of the characteristic curve 1004. In response to determining that the amplitude 1108 has fallen below a defined minimum, waveform analysis component 318 can instruct user interface component 316 to generate a diagnostic fault or error message (e.g., "Degraded Responsivity of Pixel," etc.), and may also disable the pixel and/or instruct control output component 314 to initiate a safety action.

The dispersion of data points 1110 on the characteristic curve can also be indicative of pixel jitter due to sample timing errors of the pixels. Some embodiments of analysis component 318 can monitor this dispersion across the characteristic waveform 1004 and instruct user interface component 316 to generate a diagnostic fault or error message (e.g., "Incorrect Timing or Synchronization of Pixel", etc.) if the dispersion does not conform to an expected data point dispersion. Analysis component 318 may also disable the pixel and/or instruct control output component 314 to initiate a control action of jitter is identified.

To ensure proper operation of image sensor 308, each pixel 414 should ideally act as a linear response detector to light, generating output values in proportion to incident light in the range of incident intensities defined between the noise floor of the pixel 414 and the saturation point of the pixel 414. Typically, non-linearities in pixel response are corrected through a factory calibration. However, it is possible that, during operation, pixels 414 may cease to respond to light, or become "stuck" at fixed values. In some embodiments, sensor 302 can perform a diagnostic test that verifies that all pixels 414 are responding correctly to optical stimulus by adjusting the amplitude of the auxiliary illumination generated by auxiliary LEDs 804 in a defined manner and comparing the resulting pixel output values in response to the reflected pulses 816.

For example, as part of a diagnostic test, sequencer 304 can instruct auxiliary LEDs 804 to perform a series of optical pulse emission cycles, wherein for each cycle the amplitude of the emitted pulses is varied. Data output component 310 can measure the voltages generated by each pixel in response to the portion of emitted pulses reflected from the housing 808 and received at the pixel, and convert these measured voltages to output values for each pixel for each cycle. This yields, for each pixel, a set of pixel output values corresponding to the respective different auxiliary signal amplitudes. Analysis component 318 can analyze these pixel output values to ensure that each pixel's output values fall within an expected pixel output range for the corresponding signal amplitude. If analysis component 318 determines, based on this analysis, that one or more of the pixels demonstrate no significant output variation across the range of signal amplitudes, the pixel output is assumed to be non-responsive to incident light. The analysis component 318 may also determine, based on the analysis, that the output values vary in unexpected ways across the different signal amplitudes. In response to either of these determinations, analysis component 318 can instruct the user interface component 316 to generate a diagnostic fault or error message (e.g., "Static pixel," "Non-Functioning Pixel," etc.). Analysis component 318 may also disable or tag the pixel so that the pixel is excluded from subsequent distance measurement sequences during normal operation. Control output component 314 may also initiate a safety action in response to this determination if the total number of faulty pixels exceeds a defined maximum allowable number of faulty pixels.

Although the example distance measurement and diagnostic techniques discussed above have been described in terms of emission and receipt of a single pulse for each distance measurement sequence for the sake of clarity, some embodiments of sensor 302 may emit a burst of light pulses for each measuring cycle, and each pixel 414 of image sensor 308 will accumulate the electrical output from multiple received optical pulses prior to performing distance measurement or diagnostic analysis. For example, for the example measuring sequence timing illustrated in FIG. 9, illumination source 306 may emit multiple instances of pulse 902 for a given measuring cycle, and sequencer 304 will cycle the gating signals Q1, Q2, and QBKG for each received reflected pulse 904 of the burst. The voltage values accumulated for the leading and trailing edge portions 906 and 908 of the received pulses 904 are accumulated in the respective measuring capacitors over these multiple received pulses 904 prior to converting the voltage values to digital data values for analysis. Accumulation of multiple pulses in this manner can increase measurement precision and SNR.

Accumulation of N optical pulses having energy P should ideally produce a pixel output response equal to an optical signal with energy N×P. In some embodiments, sensor 302 can verify correct accumulation behavior of each pixel 414 during a diagnostic cycle by using the auxiliary LEDs 804 to generate a test accumulation sequence for analysis of linearity and correspondence with factory settings. According to an example diagnostic test sequence, sequencer 304 can instruct LEDs 804 to emit a burst of N pulses having a known energy level which is expected to translate to a received energy level of P at the image sensor 308 after reflection from the inner surfaces of the housing 808 (allowing for some loss of energy). Sequencer 304 controls the gating signals (or otherwise controls the exposure) of the image sensor's pixel array to accumulate measurement voltages corresponding to the received pulses 816. For each pixel, data output component 310 translates these accumulated voltages to data values, and analysis component 318 analyzes these values to determine whether the accumulated values correspond to defined factory values, and whether the accumulated values demonstrate correct linear accumulation behavior. If the accumulated values are found to deviate from expected factory values in excess of a defined tolerance, or demonstrate non-linear accumulation behavior, user interface component 316 can generate a suitable diagnostic fault or error message (e.g., "Incorrect or Non-Linear Accumulation Behavior"), and the sensor 302 can disable the pixel such that the pixel does not participate in distance measurement analysis.

For proper operation of sensor 302, the image sensor's pixels 414 should operate independently of each other. That is, each pixel's measurement should not affect, or be affected by, any other pixel in the array. According to one or more embodiments, sensor 302 can verify pixel independence based on measurement of shot noise and correlation of noise sources between pixels.

Shot noise is a statistical noise source which is present in processes which can be described by a random variable having a Poisson distribution. Typically, within optical or electrical processes the random variable corresponds to the arrival time of photons (at a detector) or the flow of discrete charge particles. The Poisson distribution, which represents the distribution of probabilities of occurrence for the particular random variable, has a standard deviation which is equal to the square root of the mean value. This indicates that the variance in the electrical signal arising from a given pixel 414 and incident optical power is equal to the signal level generated by the light. Shot noise then adds a component of variability to repeated measurements which increases with the signal level.

For two independent detectors (pixels 414), the shot noise should be completely uncorrelated, since the noise is generated by spatially separate regions of incident light. However, conversely, if the two pixels 414 are not independent, e.g., as a result of a short between pixels 414 or a signal integrity fault, the shot noise associated with the two pixels 414 can be expected to be correlated to some extent. Accordingly, some embodiments of sensor 302 use this concept as the basis of a diagnostic test of the image sensor 308 to identify non-independent pixels 414. By capturing a temporal sequence of independent measurements of an auxiliary illumination signal generated by auxiliary LEDs 804 at a single incident optical power, each pixel 414 will generate a time sequence of values which can be analyzed for correlation, with significant correlation indicating non-independence of pixels 414 and hence a potential failure of detection capability.

FIGS. 12a and 12b are charts illustrating identification of correlated and uncorrelated pixels based on analysis of shot noise. FIG. 12a depicts an example scenario in which a first pixel 414a and a second pixel 414a are independent of one another (e.g., there is no improper shorting between the two pixels 414a and 414b). According to an example diagnostic test for verifying the independence of the two pixels 414a and 414b, sequencer 304 can instruct auxiliary LEDs 804 to emit pulsed test illumination at a consistent optical power, and instruct the pixels 414a and 414b of image sensor 308 to perform multiple, temporally sequential measurements of the pulsed back-reflection 816 reflected by the inner surfaces of the housing 808 and received at the image sensor 308 (see FIG. 8). According to this approach, exposure of the two pixels 414a and 414b should take place simultaneously for each of the temporally sequential measurements. That is, the respective gating signals of pixels 414a and 414b should be controlled to capture their sequential measurements at the same points in time, so that measured values for the two pixels can be compared at common points in time. For each measurement, data output component 310 converts the voltages generated by pixels 414a and 414b in response to the incident illumination to data values. Any number of test measurements can be captured during this diagnostic test, though greater numbers of test measurements are likely to yield more definitive correlation analysis results.

Upon completion of a defined number of test measurements by pixels 414a and 414b, two sets of measured values are obtained—one data set for each pixel 414a and 414b. Graphs 1202a and 1202b plot the data sets obtained by the first pixel 414a and second pixel 414b, respectively, as function of time, with each plotted data point 1206 representing one of the measured values for one of the temporally sequential measurements. Since the exposures of the two pixels 414a and 414b occurred simultaneously for each data point, each data point captured by the first pixel 414a for a given point in time has a corresponding data point captured by the second pixel 414b at the same point in time. As can be seen, the values of each data set deviate from a mean value (represented by the horizontal axes of graphs 1202a and 1202b) due to shot noise. If the two pixels 414a and 414b are truly independent, the deviations experienced at each pixel due to shot noise should be independent from one another, and no correlation between the data sets will be found.

Once the two data sets have been obtained, analysis component 318 can perform correlation analysis on the two data sets to determine whether the two data sets demonstrate a degree of correlation in excess of a correlation threshold indicative of cross-correlation between the two pixels 414a and 414b. In this regard, analysis component 318 can use any suitable technique for determining correlation or non-correlation of the two data sets, including but not limited to Pearson's correlation coefficient, cross-correlation of time series, or scaled correlation. Scatter plot 1204 plots the measured values of the first pixel 414a against the measured values of the second pixel 414b. Based on the substantially random distribution of data in scatter plot 1204, analysis component 318 can determine that there is no correlation between the data sets captured by the two pixels 414a and 414b, and thus verify that there is no improper cross-correlation between pixel 414a and 414b.

FIG. 12b depicts a scenario in which there is a short between pixel 414a and 414b, resulting in improper cross-correlation between the two pixels 414a and 414b. Example measured values captured by pixel 414a and 414b during the diagnostic test sequence for this scenario are plotted as a function of time in graphs 1202c and 1202d, and scatter plot 1206 plots the measured values of the first pixel 414a against the measured values of the second pixel 414b. In this scenario, the linearity of scatter plot 1206 reveals a strong positive correlation between the values measured by the first pixel 414a and the values measured by the second pixel 414b. Analysis component 318 can identify this correlation between the two data sets, and based on this correlation identify an improper short (or other cause of non-independence) between the two pixels 414a and 414b. In response to identifying this correlation, user interface component 316 can generate a suitable error message (e.g., "Cross-Correlation Between Pixels in Normal Signal Range," "Cross Correlation between Pixels in Saturated Signal Range," etc.). In some embodiments, the sensor 302 may also disable or tag any pixels that are identified as being improperly cross-correlated with another pixel and exclude those pixels from subsequent distance measurement sequences during normal sensor operation to prevent improper distance measurements. If the number of faulty pixels exceeds a defined maximum number of allowed faulty pixels, control output component 314 may also be instructed to perform a safety action.

In general, sensor 302 can perform this pixel independence verification for multiple pairs of pixels 414 that make up the image sensor 308. In some embodiments, the diagnostic test sequence may perform this correlation analysis for each pairing of two pixels across the entire pixel array of the image sensor 308. Alternatively, in some embodiments it may be assumed that cross-correlation has a higher likelihood of occurring between adjacent pixels or pixels that are within a defined pixel distance of one another, and the diagnostic test may only perform this cross-correlation check between pairs of adjacent pixels or between pixels that are within the defined pixel distance of one another.

Also, in some embodiments, the diagnostic cross-correlation test can be performed separately for different power levels of the auxiliary optical signal. For example, multiple iterations of the diagnostic test described above can be performed, with the power level of the signal emitted by auxiliary LEDs 804 being altered (e.g., increased or decreased) for each iteration. Correlation analysis can then be performed separately for the data sets generated by each iteration. Performing the test in this manner can identify pixels that are cross-correlated only within a specific range of incident light power (e.g., in the normal signal range or in the saturated signal range). This allows the user interface component 316 to provide more detailed information about the pixel correlations (e.g., by identifying the signal range within which the correlation is observed).

Embodiments of active illumination 3D sensor 302 can incorporate any combination of one or more of the diagnostic tests and features described above. Inclusion of these sensor diagnostic features can improve the reliability and distance measurement accuracy of the sensor 302 and reduce the probability of a dangerous failure of the sensor, yielding a sensor that meets the required SIL even if only a single channel is used for the active measurement subsystem. In some implementations, the various diagnostic features described herein can yield diagnostic coverage of the sensor that equals or exceeds 90%, and a probability of failures per hour of less than $10^{-7}$. This level of diagnostic coverage can eliminate reliance on multiple channels or hardware redundancy in order to achieve sufficient levels of SIL safety that render the sensor 302 suitable for industrial safety applications.

FIGS. 13-18b illustrate methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 13:
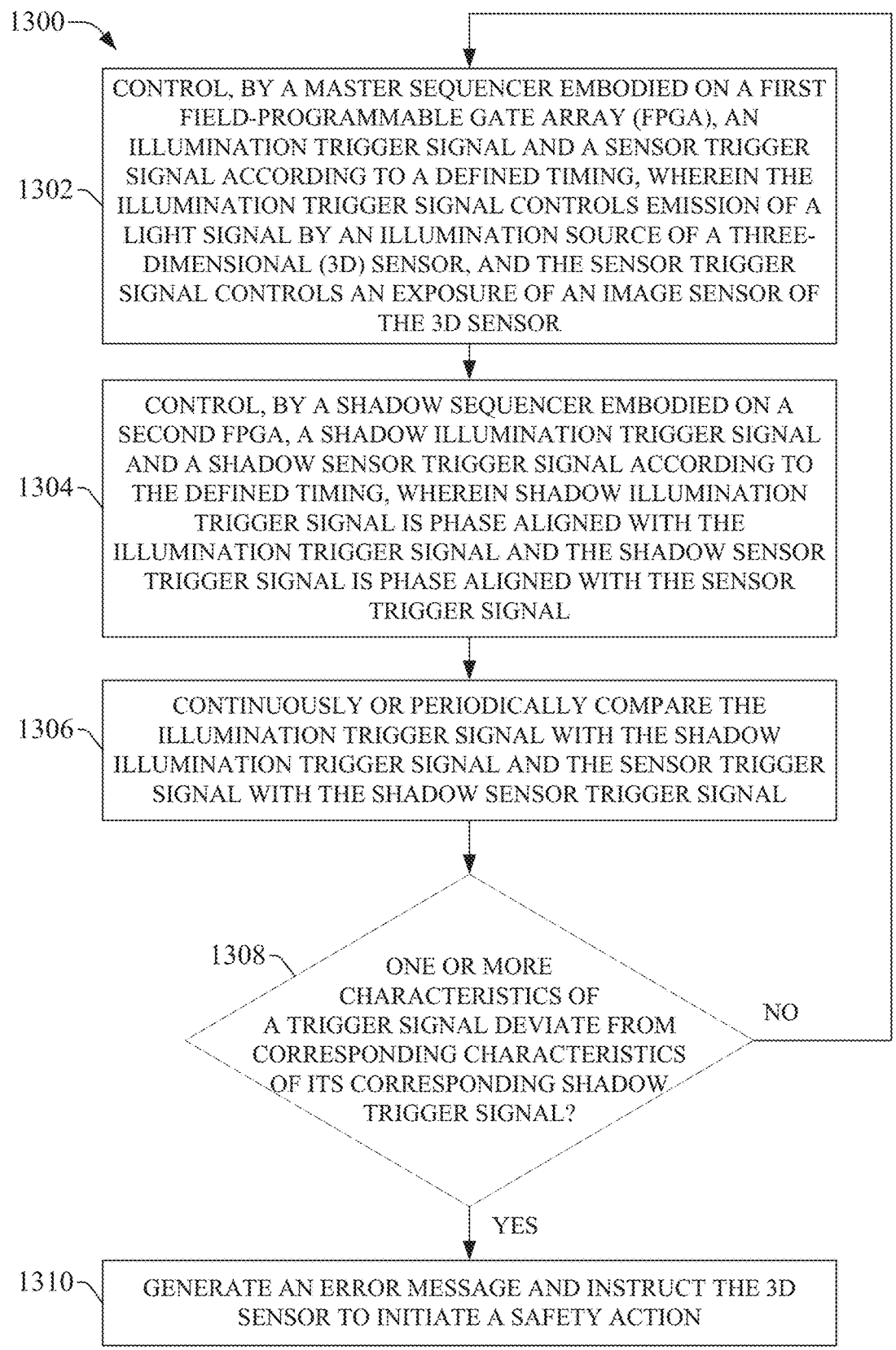
FIG. 13 is a flowchart of an example methodology for diagnosing performance of a sequencer that controls synchronous operation of an illumination source and an image sensor of an active illumination 3D sensor.

FIG. 13 is an example methodology 1300 for diagnosing performance of a sequencer that controls synchronous operation of an illumination source and an image sensor of an active illumination 3D sensor. The 3D sensor may be, for example, a TOF sensor or another type of 3D sensor. In some scenarios, the 3D sensor may be used to detect intrusion of people or objects within a monitored industrial area as part of an industrial safety application.

Initially, at 1302, an illumination trigger signal and a sensor trigger signal are controlled by a master sequencer embodied on a first field-programmable gate array (FPGA) according to a defined timing. The illumination trigger signal can control emission of a pulsed light signal by an illumination source of the 3D sensor sensor, and the sensor trigger signal can control exposures of an image sensor of the 3D sensor. The image sensor may comprise an array of pixels that capture measurements of received reflected light pulses that are incident on the image sensor in response to the sensor trigger signal. The sequencer controls the illumination and sensor trigger signals in a synchronized manner to ensure proper measurement of the received optical signal.

At 1304, a shadow illumination trigger signal and a shadow sensor trigger signal are controlled by a shadow sequencer embodied on a second FPGA according to the same defined timing used to control the master sequencer's trigger signals. The shadow illumination trigger signal is phase aligned with the illumination trigger signal, and the shadow sensor trigger signal is phase aligned with the sensor trigger signal. The shadow trigger signals serve as a basis for comparison in order to identify when the timing of the master trigger signals has deviated from the defined timing, resulting in improper synchronization between illumination and exposure.

At 1306, on a continuous or periodic basis, the illumination trigger signal is compared with the shadow illumination trigger signal, and the sensor trigger signal is compared with the shadow sensor trigger signal. One or more different properties of the trigger signals can be compared with their corresponding properties of the shadow trigger signals, including but not limited to signal timings, pulse widths, slew rates, overshoot, undershoot, and stability. At 1308, a determination is made as to whether one or more characteristics of either of the trigger signals monitored at step 1306 deviate from their corresponding characteristics of their corresponding shadow trigger signal in excess of a defined tolerance. If there is no deviation between the trigger signals and their corresponding shadow signals (NO at step 1308), the methodology returns to step 1302 and steps 1302-1308 repeat. If a deviation of one or more of the monitored characteristics is identified (YES at step 1308), the methodology proceeds to step 1310, where the 3D sensor generates a diagnostic fault or error message and a safety action is initiated. The safety action may be, for example, initiation of a signal to a safety relay that disconnects power to a hazardous machine, initiation of a signal that switches the hazardous machine to a safe operating mode, or another such safety action.

Figure 14:
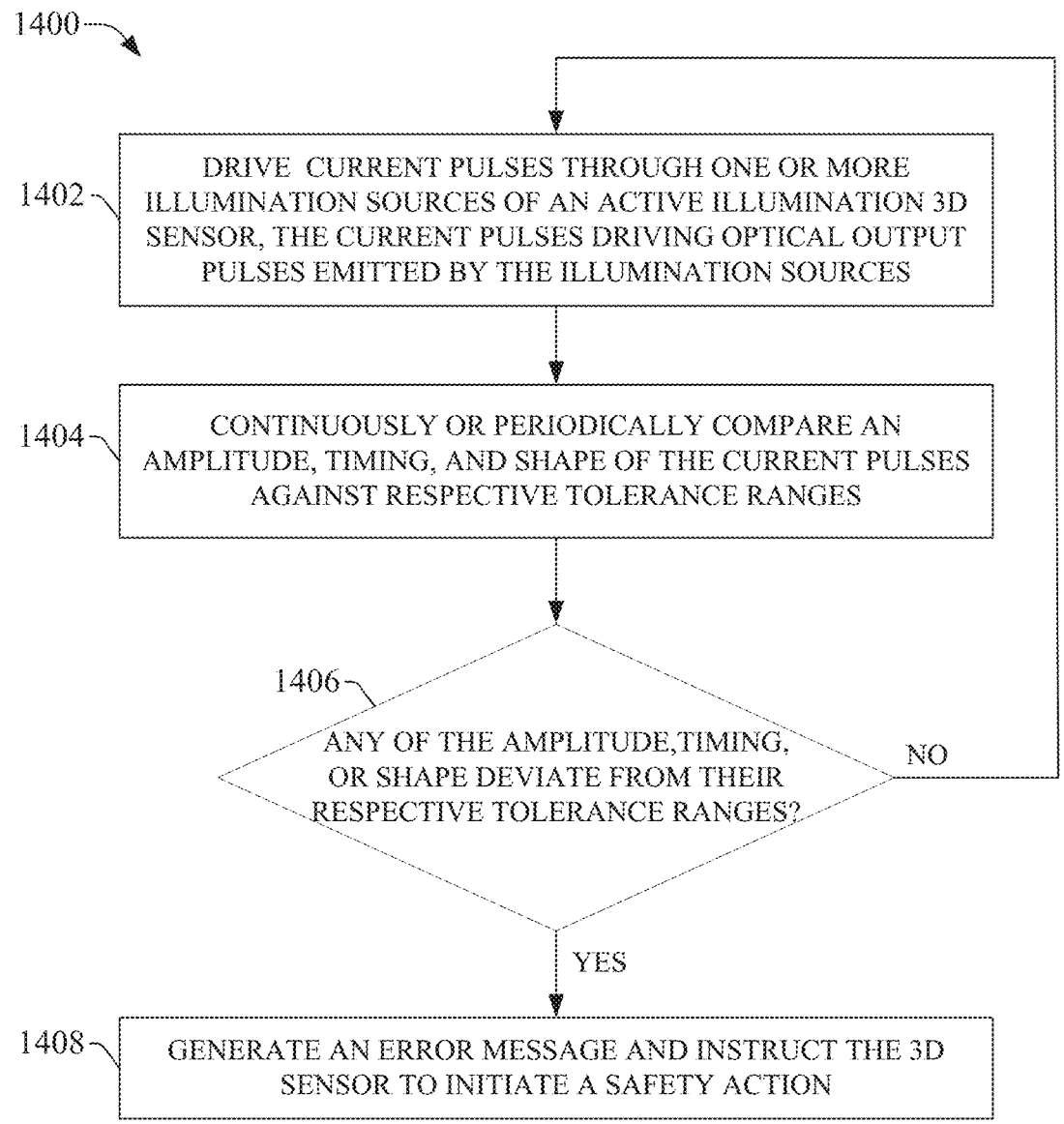
FIG. 14 is a flowchart of an example methodology for verifying that correct current pulses are being used to drive illumination sources of an active illumination 3D sensor.

FIG. 14 is an example methodology 1400 for verifying that correct current pulses are being used to drive illumination sources of an active illumination 3D sensor. Initially, at 1402, current pulses are driven through one or more illumination sources (e.g., laser sources, LEDs, VCSELs, etc.), where the current pulses drive optical output pulses emitted by the illumination sources. In some implementations, the current pulses can be driven by a current driver chip that regulates short current pulses having a precisely defined amplitude, shape, and timing.

At 1404, the amplitude, timing, and shape of the current pulses are continuously or periodically compared against respective tolerance ranges to ensure that the current pulses conform to designed specifications. This current pulse monitoring can be performed, for example, by a current sense system incorporated in the analog current drive circuitry. At 1406, a determination is made as to whether any of the amplitude, timing, or shape of the current pulses deviate from their respective tolerance ranges. If none of the current pulse characteristics deviate from their tolerance ranges (NO at step 1406) the methodology returns to step 1402 and steps 1402-1406 repeat. If any of the current pulse characteristics are found to deviate from their tolerance ranges (YES at step 1406), the methodology proceeds to step 1408, where a diagnostic fault or message is generated by the 3D sensor, and the 3D sensor is instructed to initiate a safety action.

Figure 15:
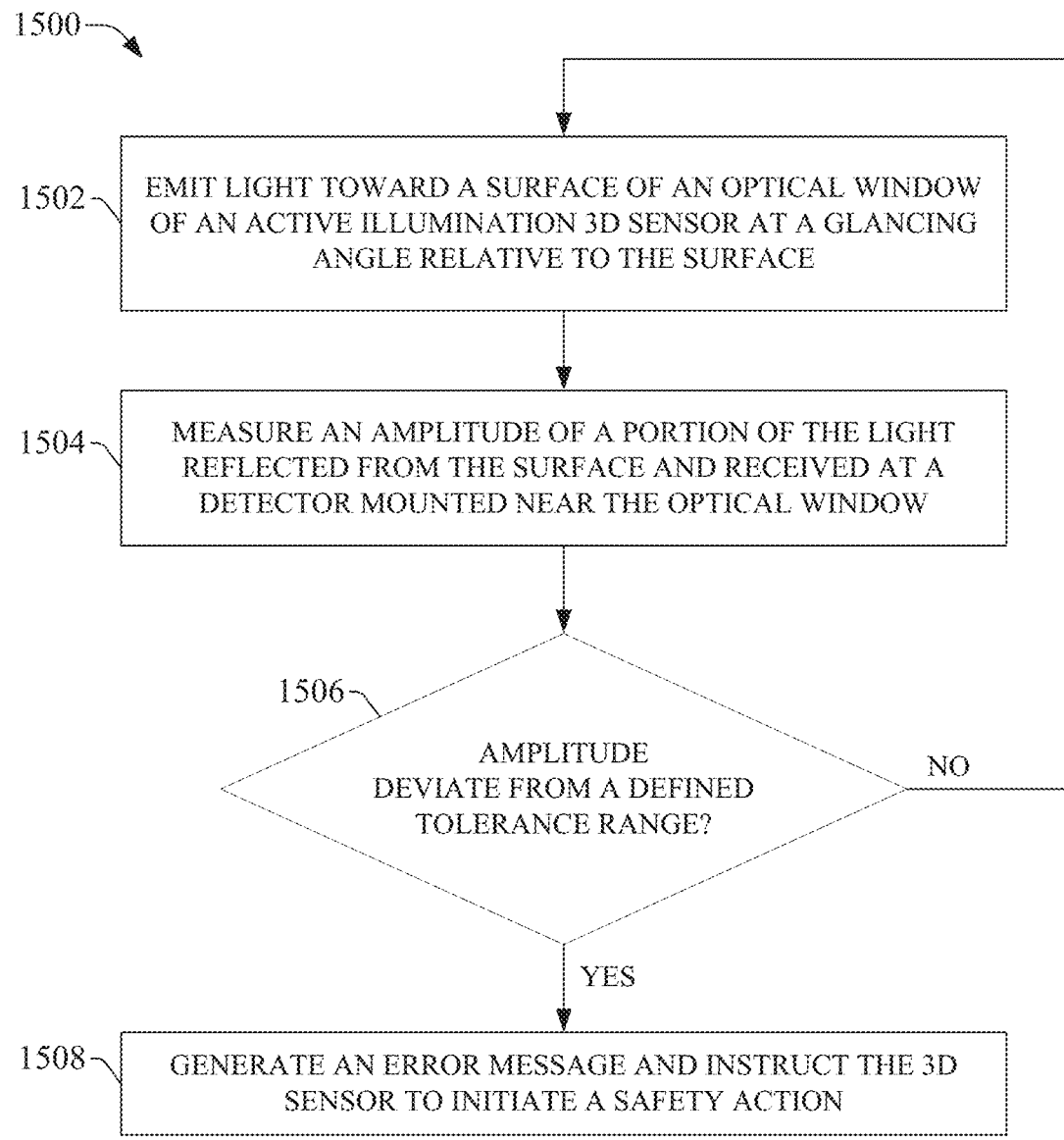
FIG. 15 is a flowchart of an example methodology for detecting the presence of pollution on an input or output optical window of an active illumination 3D sensor.

FIG. 15 is an example methodology 1500 for detecting the presence of pollution on an input or output optical window of an active illumination 3D sensor. Initially, at 1502, light is emitted toward a surface of the optical window at a glancing angle relative to the surface. The light can be emitted, for example, by an illumination source mounted near one side of the optical window. At 1504, an amplitude of a portion of the light reflected from the surface of the optical window and received at a detector mounted near the optical window is measured. The detector can be mounted near a side of the optical window opposite the illumination source and oriented to face the illumination source so that a measurable amount of the light reflected from the surface of the optical window is received.

At 1506, a determination is made as to whether the measured amplitude of the received light deviates from a tolerance range defined for each of the two measured properties. The defined tolerance ranges are indicative of a clean optical window free of pollutants (e.g., dirt particles, dust, oil, etc.) and damage. If no deviations are detected (NO at step 1506), the methodology returns to step 1502 and steps 1502-1506 are repeated. Alternatively, if a deviation is found in either the amplitude (YES at step 1506) due to scattering of the projected light by pollutants or damage on the surface of the optical window, the methodology proceeds to step 1508, where the sensor generates an error message and initiates a safety action.

Figure 16:
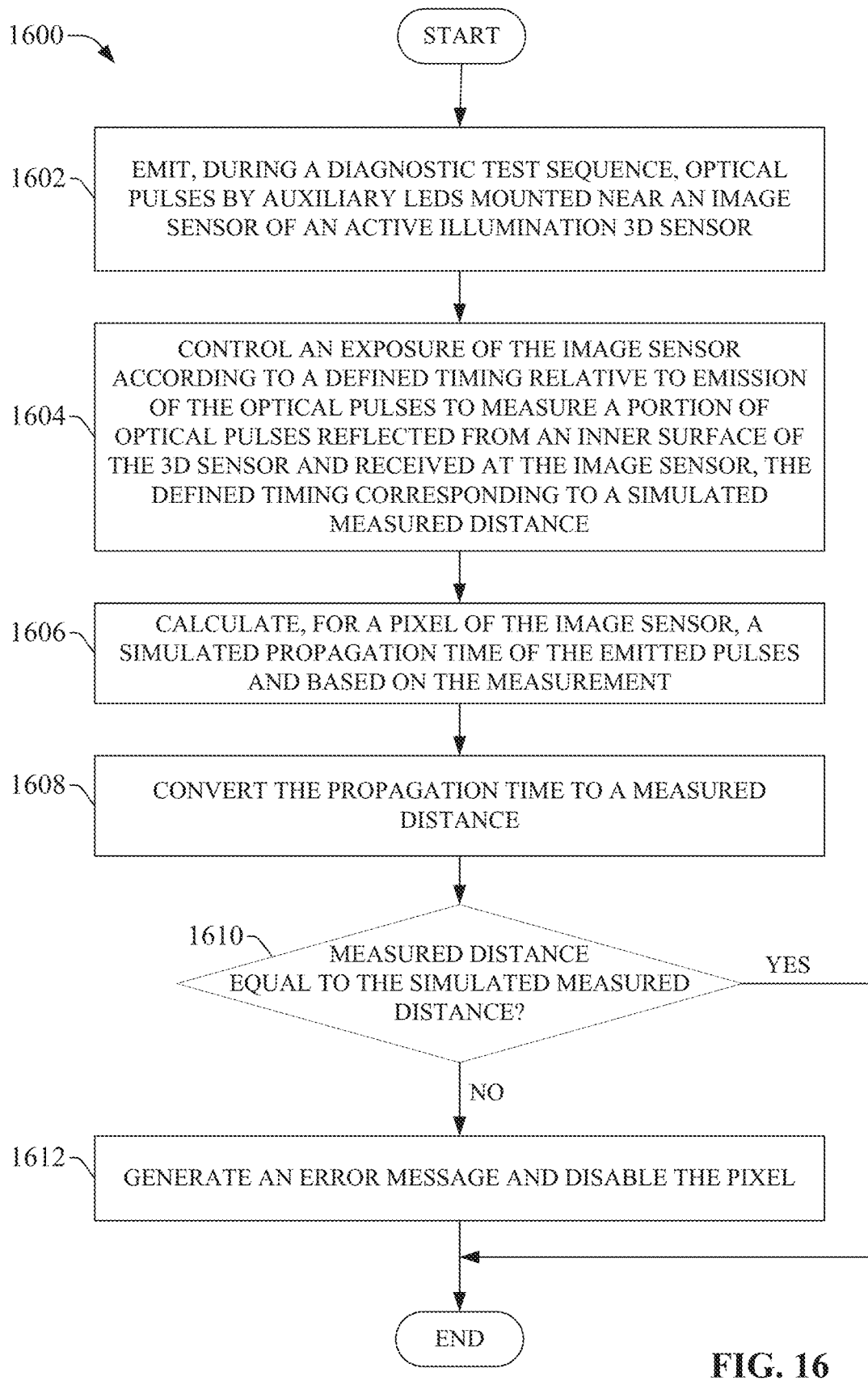
FIG. 16 is a flowchart of an example methodology for diagnostically verifying correct time-of-flight distance measurement by an image sensor of an active illumination 3D sensor.

FIG. 16 is an example methodology 1600 for diagnostically verifying correct time-of-flight distance measurement by an image sensor of an active illumination 3D sensor. Initially, at 1502, optical pulses are emitted by auxiliary LEDs mounted near an image sensor of the 3D sensor during the diagnostic test. In some embodiments, the LEDs can be mounted on the same substrate, PCB, or chip as the image sensor and directed toward the input optic of the 3D sensor. At 1604, an exposure of the image sensor is controlled according to a defined timing relative to emission of the optical pulses emitted at step 1602 to measure a portion of the optical pulses reflected from an inner surface of the 3D sensor and received at the image sensor. The defined timing between emission of the optical pulses and exposure of the image sensor is selected to correspond to a simulated measured distance by simulating a particular pulse propagation time corresponding to a simulated distance. Each individual pixel of the pixel array that makes up the image sensor can be exposed according to this timing.

At 1606, a simulated propagation time of the emitted pulses is calculated for a pixel of the image sensor based on the measurement performed at step 1604. At 1608, the propagation time obtained at step 1606 is converted to a measured distance. At 1610, a determination is made as to whether the measured distance obtained at step 1608 is equal to the expected simulated measured distance corresponding to the emission and exposure timing. If the measured distance is not equal to the expected simulated measured distance within a defined tolerance (NO at step 1610), indicating that the pixel is not accurately measuring propagation times and distances, the methodology proceeds to step 1612, where the 3D sensor generates a diagnostic fault or error message and disables the pixel such that the pixel is excluded from subsequent distance measurement sequences. In some embodiments, if the sensor is being used in an industrial safety monitoring application, the sensor may also initiate a safety action at step 1612. If the measured distance is found to be within the defined tolerance of the expected distance (YES at step 1610), the pixel is assumed to be measuring correctly and the methodology ends.

Figure 17A:
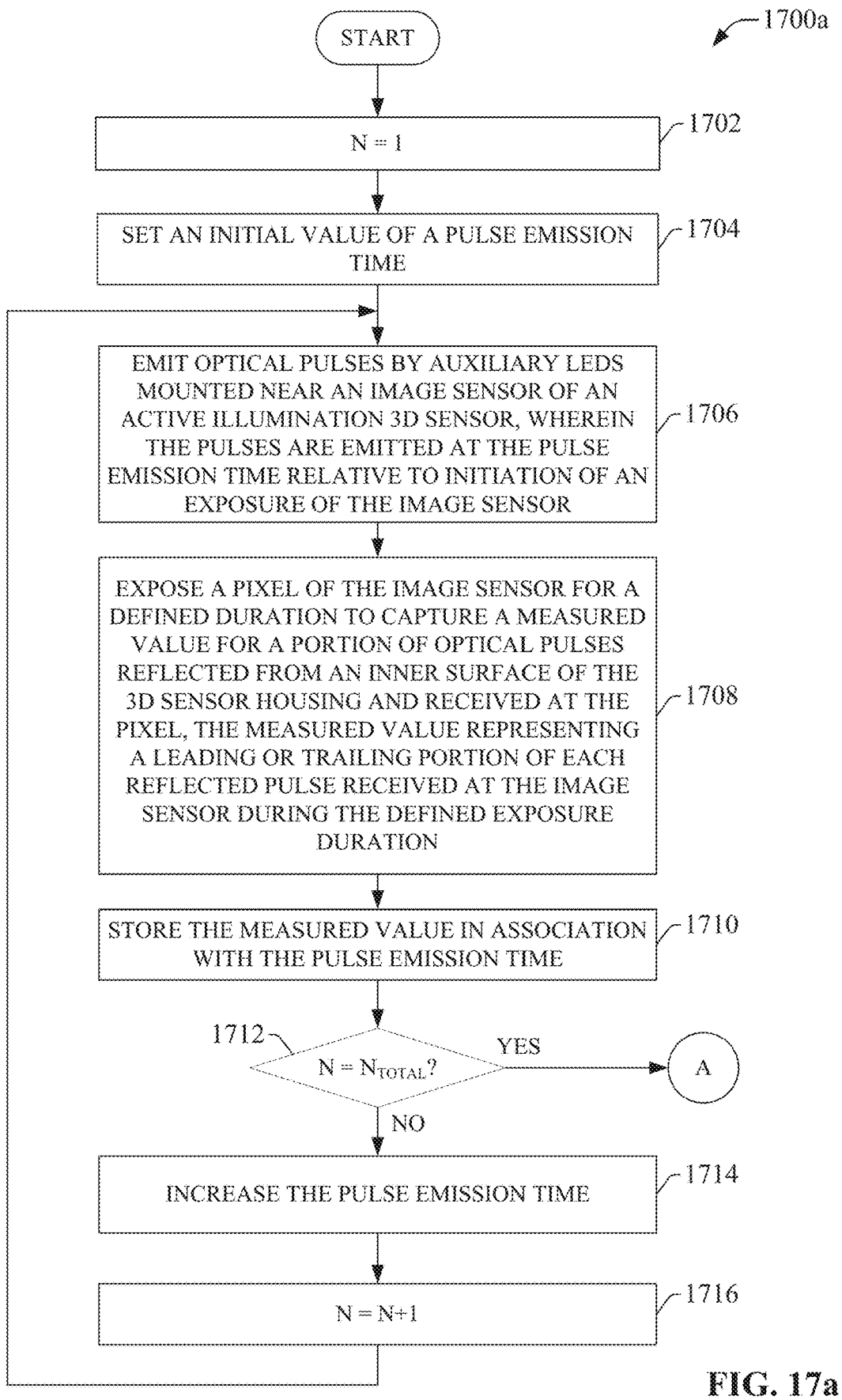
FIG. 17a is a first part of an example methodology for verifying correct timing and/or response to light of a pixel of an image sensor.

FIG. 17a is a first part of an example methodology 1700a for verifying correct timing and/or response to light of a pixel of an image sensor. Initially, at 1702, an integer variable N is set equal to 1. Variable N serves as a counter for tracking iterations of a diagnostic test cycle to be performed on the pixel. At 1704, a pulse emission time is set to an initial value. This pulse emission time represents a time of emission of a test pulse by an auxiliary LED (or another type of auxiliary illumination source) relative to initiation of an exposure sequence of the image sensor.

At 1706, for a first iteration of the diagnostic test cycle, optical pulses are emitted by the auxiliary LEDs, which are mounted near the image sensor and have a configuration similar to that described above in connection with step 1602 of methodology 1600 (and illustrated in FIG. 8). For this first iteration, these optical pulses are emitted according to the pulse emission time set at step 1704. At 1708, the pixel being tested is exposed for a defined duration for each emitted pulse. The timing of the exposure relative to emission of the pulse at step 1706 is a function of the pulse emission time. Each exposure of the pixel at step 1708 causes the pixel to capture a measured value proportional to a portion of each optical pulse reflected by the inner surface of the 3D sensor's housing and received at the pixel of the image sensor. This measured value represents a leading or trailing edge pulse portion that was received at the pixel during the exposure duration, and the magnitude of this value is partially a function of the pulse emission time relative to the beginning of the exposure (see, e.g., FIG. 9).

In some embodiments, step 1706 can emit a burst of pulses while step 1708 can perform a commensurate number of pixel exposures (with the timing between each pulse emission and its corresponding pixel exposure remaining consistent, as defined by the pulse emission time), allowing the pixel to accumulate a voltage measurement (e.g., in a measuring capacitor) with a sufficiently high SNR for accurate conversion to the measured pulse portion value. Also, although FIG. 17a depicts emission of the optical pulses occurring before initiation of the pixel exposure, in some iterations of the diagnostic test cycle the pixel exposure of step 1708 may be initiated before emission of the optical pulses at step 1706, depending on the pulse emission time for the present iteration (see, e.g., FIG. 10a). At 1710, the measured value is stored in association with the pulse emission time.

At 1712, a determination is made as to whether iteration counter N is equal to a total number of iterations $N_{TOTAL}$ to be executed for the present diagnostic test. If N is not equal to $N_{TOTAL}$ (NO at step 1712), the methodology proceeds to step 1714, where the pulse emission time is increased by a delay amount. The iteration counter N is incremented at step 1716, and the methodology repeats steps 1706 and 1708 using the updated, delayed pulse emission time. Since the pulse emission time is delayed for this subsequent iteration relative to the previous iteration, the pixel will capture a larger or smaller portion of the received pulse relative to the previous iteration (depending on the pulse emission time), and consequently the measured value captured at step 1708 will be different than the measured value of the previous iteration.

Steps 1706-1716 repeat for $N_{TOTAL}$ iterations, with the pulse emission time being delayed for each iteration, such that the emitted pulses sweep from an initial emission time (for the first iteration) to a final emission time (for the final iteration) in delay increments across the iterations, as described above in connection with FIG. 10a. When all iterations have been completed (YES at step 1712), the methodology proceeds to the second part 1700b illustrated in FIG. 17b.

At the completion of the $N_{TOTAL}$ iterations, $N_{TOTAL}$ measured values are stored in association with the respective pulse emission times that gave rise to the values. At 1718, the measured values stored at step 1710 are used to create a temporal sequence as a function of the pulse emission time used to obtain the respective measured values. At 1720, a curve fitting function is applied to the temporal sequence of $N_{TOTAL}$ measured values to yield a high resolution waveform representing a characteristic curve for the pixel data values. Properties of the characteristic curve are indicative of the pixel's response to light, timing, and dynamic range (as described above in connection with FIGS. 10b and 11).

At 1722, one or more properties of the characteristic curve obtained at step 1720 are compared with expected values of the one or more properties. For example, values of the waveform data at specific points along the characteristic curve can be compared with expected values for those points indicative of proper timing and response to light. Other characteristics of the curve that can be compared with expected characteristic values can include, but are not limited to, the amplitude of the characteristic curve, the location of the curve's peak, the width of the peak, and the overall shape of the curve.

At 1724, a determination is made as to whether one or more properties of the characteristic curve deviate from their expected values in excess of a defined tolerance. If one or more of the properties deviate outside of their defined tolerances (YES at step 1726), the methodology proceeds to step 1726, where the 3D sensor generates a diagnostic fault or error message and disables or tags the pixel to exclude the pixel from subsequent distance measuring sequences during normal operation of the 3D sensor. In some embodiments, the sensor may also initiate a safety action at step 1726. The safety action may comprise generating an output signal that renders a hazardous machine safe (e.g., by disconnecting power to the machine or placing the machine in a safe operating mode). If the properties of the curve are within their defined tolerances (NO at step 1726), the methodology ends without generating an error message or disabling the pixel. In general, the methodology of FIGS. 17a and 17b can be carried out for each pixel in the pixel array that makes up the image sensor to ensure that each pixel is operating with the correct timing and response.

Figure 17B:
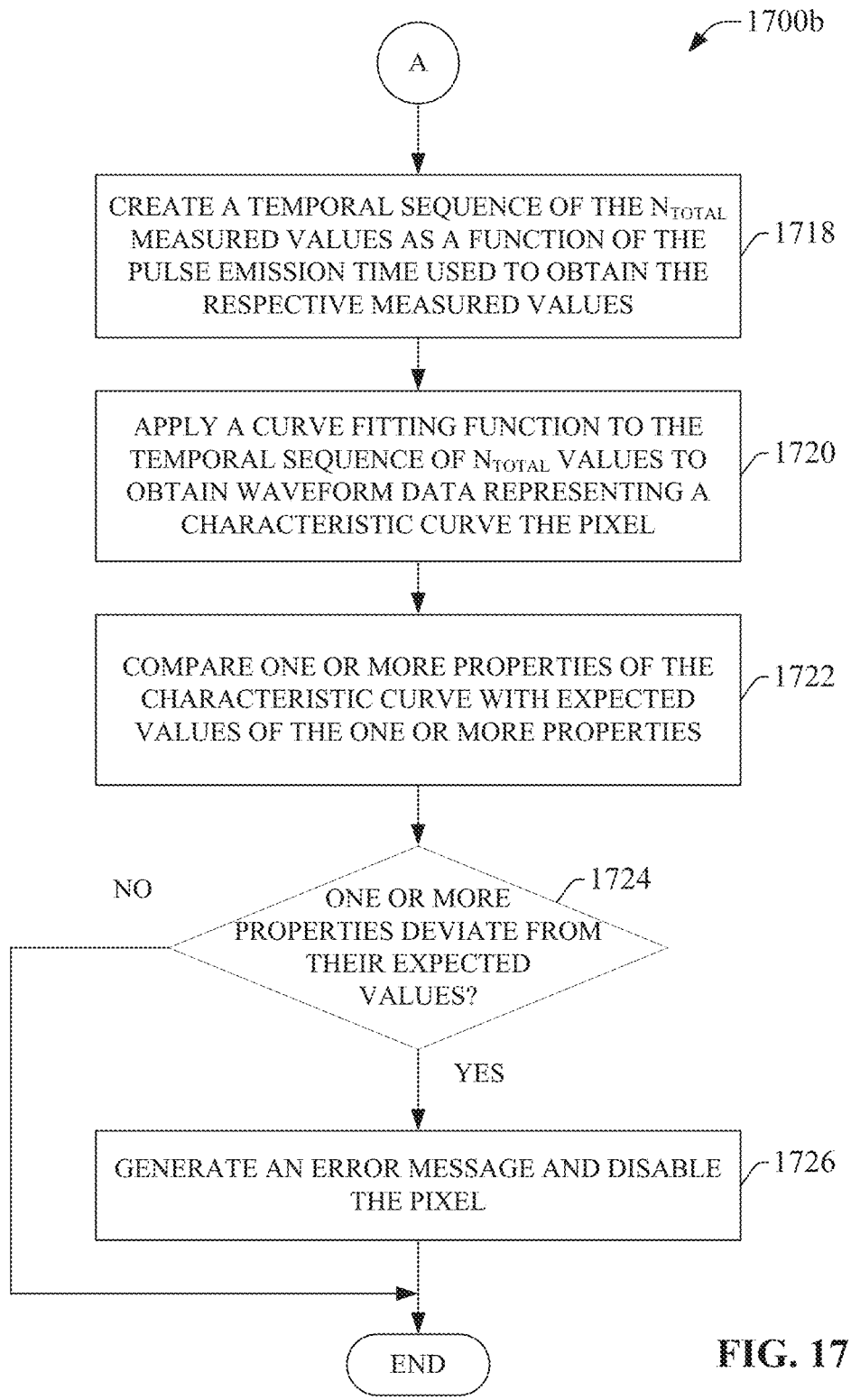
FIG. 17b is a second part of the example methodology for verifying correct timing and/or response to light of a pixel of the image sensor.

Although the methodology depicted in FIGS. 17a and 17b considers only a single characteristic curve for analysis, in some embodiments in which each pixel comprises multiple measuring capacitors, a characteristic curve may be generated for each measuring capacitor using the techniques described above, and properties of each curve can be assessed for proper timing and response to light.

Figure 18A:
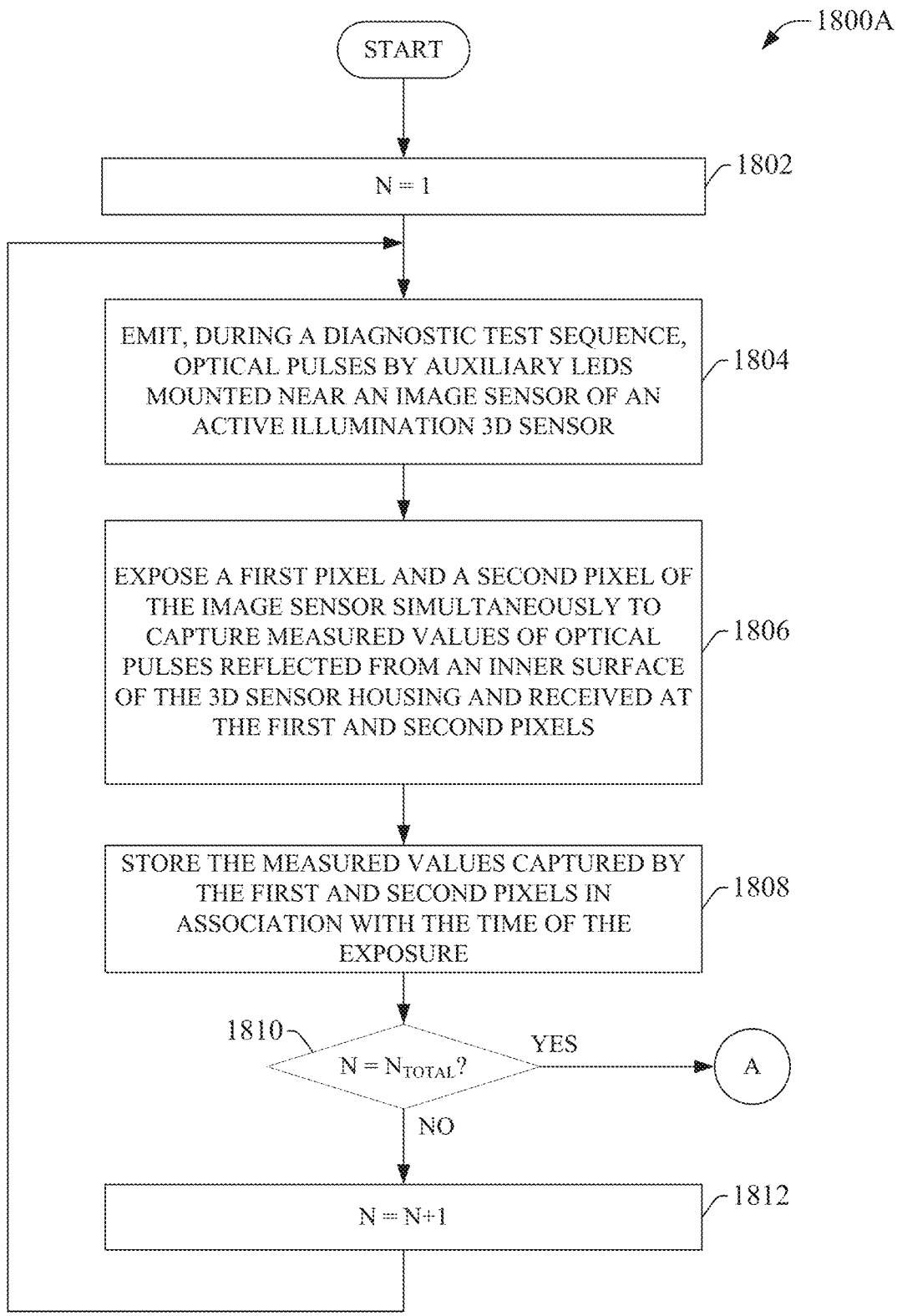
FIG. 18a is a first part of an example methodology for verifying pixel-to-pixel independence in an image sensor used in an active illumination 3D sensor.

FIG. 18a is a first part of an example methodology 1800a for verifying pixel-to-pixel independence in an image sensor used in an active illumination 3D sensor. Initially, at 1802, an iteration counter variable N is set equal to 1. At 1804, optical pulses are emitted by auxiliary LEDs mounted near the image sensor. The auxiliary LEDs and image sensor can have an architecture similar to that depicted in FIG. 8. At 1806, a first pixel and a second pixel of the image sensor's pixel array are exposed simultaneously to capture measured values of optical pulses reflected from an inner surface of the 3D sensor housing and received at the first and second pixels. The measured values represent an amount of light received at the respective pixels during the exposures of the pixels. Exposure of the first and second pixels may involve, for example, simultaneously triggering the gating signals of the two pixels to capture voltages in the pixels' measuring capacitors proportional to the amount of light received at the pixels. At 1808, the measured values captured by the first and second pixels are stored in association with the time or index of the pixel exposures.

At 1810, a determination is made as to whether the iteration counter N is equal to a total number of exposures $N_{TOTAL}$ to be captured during the diagnostic test sequence. If N is not equal to $N_{TOTAL}$ (NO at step 1810), the methodology returns to step 1804, and steps 1804-1810 are repeated to capture another pair of measured values for the first and second pixels. Steps 1804-1810 repeat until $N_{TOTAL}$ exposures have been taken, resulting in two sets of $N_{TOTAL}$ temporally sequential data values corresponding to the first and second pixels, respectively. Since the power level of the emitted light pulses remains consistent during the diagnostic test sequence, each of the two sets of $N_{TOTAL}$ data values will have a mean value proportional to the amount of reflected light received at the pixel, but will deviate around this mean value due to shot noise.

Figure 18B:
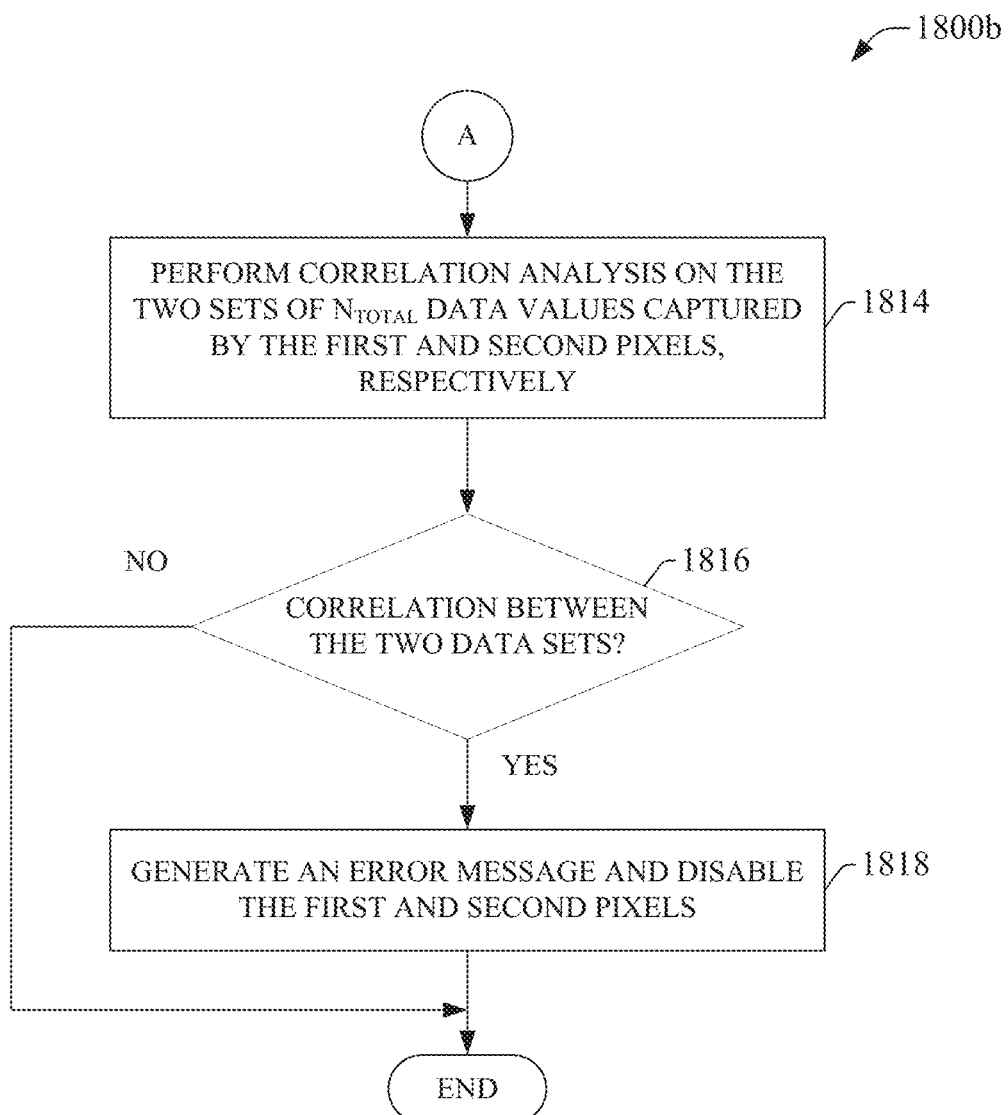
FIG. 18b is a second part of the example methodology for verifying pixel-to-pixel independence in the image sensor used in an active illumination 3D sensor.

When $N_{TOTAL}$ exposures of the first and second pixels have been taken (YES at step 1810), the methodology proceeds to the second part 1800b illustrated in FIG. 18b. At 1814, correlation analysis is performed on the two sets of $N_{TOTAL}$ data values captured by the first and second pixels, respectively. Any suitable technique can be applied by the 3D sensor to determine whether a correlation exists between the two data sets (e.g., Pearson's correlation coefficient, cross-correlation of time series, scaled correlation, etc.). At 1816, a determination is made, based on the correlation analysis performed at step 1814, as to whether a correlation exists between the two data sets. Detection of a correlation between the two data sets implies non-independence, or cross-correlation, of the two pixels. If a correlation is discovered between the two data sets (YES at step 1816), the methodology proceeds to step 1818, where the 3D sensor generates a diagnostic fault or error message and disables the two pixels. Step 1818 may also initiate a safety action in some embodiments. The safety action may also involve generating a control signal that places a hazardous machine in a safe state.

Embodiments, systems, and components described herein, as well as industrial control systems and industrial automation environments in which various aspects set forth in the subject specification can be carried out, can include optical sensors, computer or network components such as servers, clients, programmable logic controllers (PLCs), automation controllers, communications modules, mobile computers, wireless components, control components and so forth which are capable of interacting across a network.

Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as Common Industrial Protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
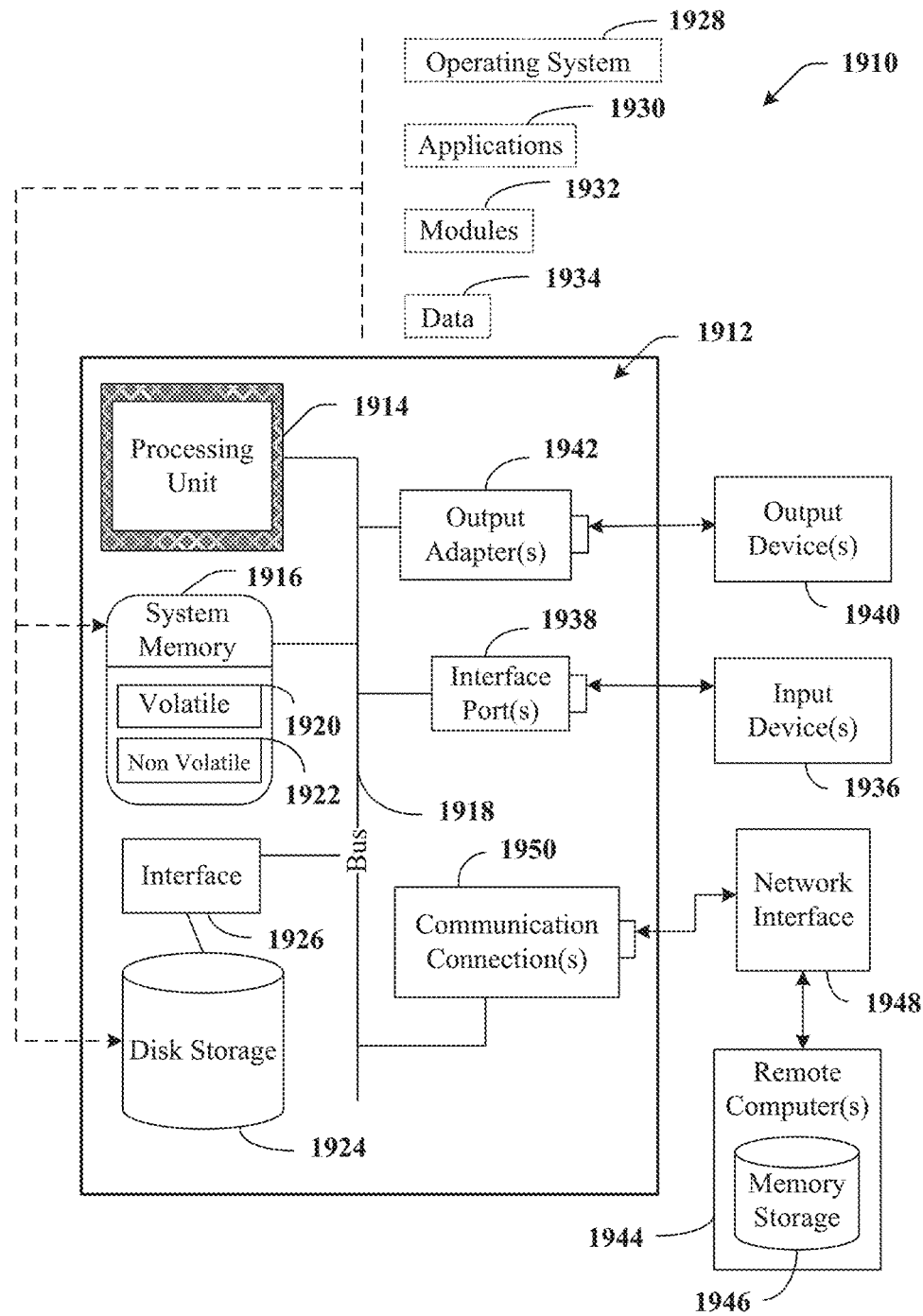
FIG. 19 is an example computing environment.
Figure 20:
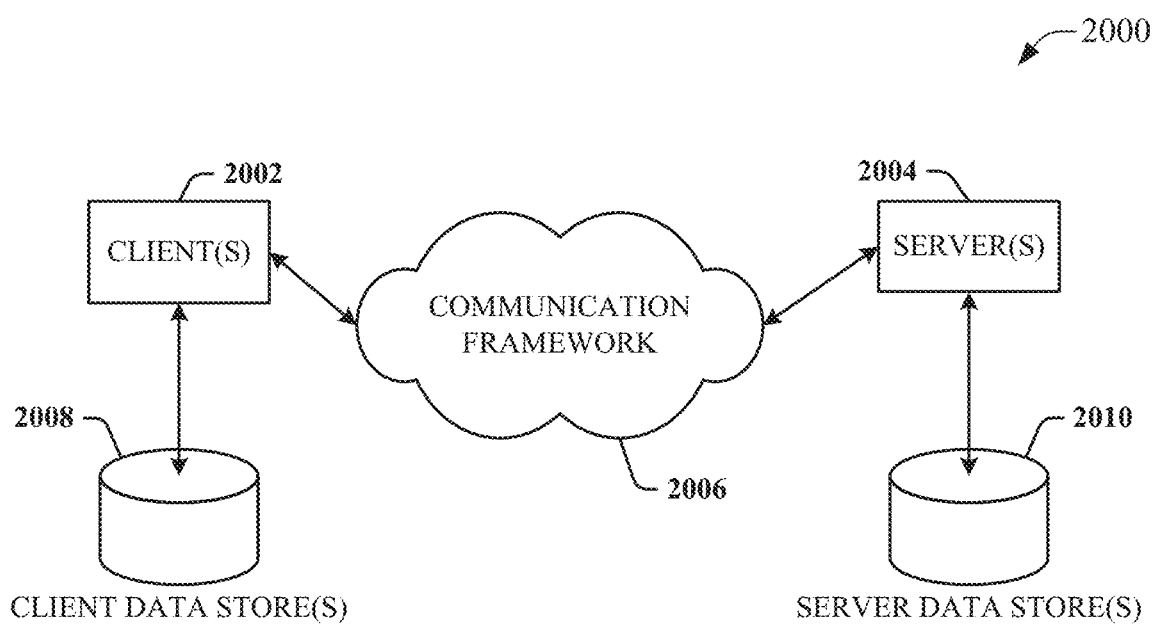
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/non-volatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapters 1942 are provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1948 can also encompass near field communication (NFC) or Bluetooth communication.

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 1704 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An active illumination three-dimensional (3D) sensor system, comprising:
   an illumination source configured to emit light pulses to a monitored area;
   an auxiliary illumination source mounted inside a housing of the 3D sensor system and oriented to emit auxiliary light pulses toward an inner surface of the housing;
   an image sensor comprising an array of pixels, wherein the image sensor is configured to:
      measure a quantity of light received at a pixel of the array of pixels and generate electrical charge in proportion to the quantity of light; and
      measure, during a diagnostic test sequence, a subset of the auxiliary light pulses reflected from the inner surface of the housing and received at the pixel as reflected auxiliary light pulses; and
   one or more processors configured to:
      convert the electrical charge to one or more digital data values representing the quantity of light received at the pixel;
      determine a distance of a surface within the monitored scene based on analysis of the one or more digital data values;

perform, during the diagnostic test sequence, multiple iterations of the emission of the auxiliary light pulses and the exposure of the pixel;

generate multiple digital test data values respectively corresponding to the multiple iterations based on measurements of the subset of the auxiliary light pulses taken by the pixel during respective iterations of the multiple iterations;

create a temporal sequence of the multiple digital test data values as a function of the time of the emission relative to the exposure;

generate waveform data for the pixel using the temporal sequence of the multiple digital test data values; and generate diagnostic data for the pixel based on analysis of the waveform data.

2. The active illumination 3D sensor system of claim 1, wherein the waveform data is generated based on application of a curve-fitting function to the temporal sequence of the multiple digital test data values.

3. The active illumination 3D sensor system of claim 1, wherein the one or more processors are further configured to add, for each iteration after a first iteration of the multiple iterations, a delay to a time of the emission of the auxiliary light pulses relative to the exposure of the pixel.

4. The active illumination 3D sensor system of claim 1, wherein the one or more processors are further configured to generate auxiliary illumination trigger signals that control emission of the auxiliary light pulses by the auxiliary illumination source and sensor trigger signals that control exposure of the pixel of the image sensor.

5. The active illumination 3D sensor system of claim 1, wherein the one or more processors are further configured to:

control a timing between the emission of the auxiliary light pulses and the exposure of the pixel to simulate a pulse propagation time corresponding to a defined distance;

calculate a simulated distance based on the measurement of the subset of the auxiliary light pulses; and in response to determining that the simulated distance is not within a defined tolerance of the defined distance, disable the pixel and generate an error message.

6. The active illumination 3D sensor system of claim 5, wherein the one or more processors are configured to:

compare values of the waveform data corresponding to respective timings between the emission of the auxiliary light pulses and the exposure of the pixel with expected values of the waveform data for the respective timings; and in response to determining that one or more of the values of the waveform data deviate from their corresponding expected values in excess of a defined tolerance, disable the pixel and generate an error message.

7. The active illumination 3D sensor system of claim 6, wherein the one or more processors are configured to:

identify a property of a characteristic waveform defined by the waveform data, wherein the property is at least one of a position of a peak of the characteristic waveform, a width of the peak of the characteristic waveform, an amplitude of the characteristic waveform, or a shape of the characteristic waveform;

compare the property with an expected value of the property defined for the pixel; and in response to determining that the property deviates from the expected value in excess of a defined tolerance, disable the pixel and generate an error message.

8. The active illumination 3D sensor system of claim 1, wherein the one or more processors are configured to:

generate an illumination trigger signal that controls emission of the light pulses by the illumination source and a sensor trigger signal that controls exposure of the pixel of the image sensor;

generate a shadow illumination trigger signal having a same timing and phase as the illumination trigger signal, and a shadow sensor trigger signal having a same timing and phase as the sensor trigger signal; and monitor for deviations between the illumination trigger signal and the shadow illumination trigger signal and monitor for deviations between the sensor trigger signal and the shadow sensor trigger signal.

9. The active illumination 3D sensor system of claim 1, further comprising a current sense system configured to monitor at least one of an amplitude, a timing, or a shape of current pulses driven through the illumination source, and in response to determining that at least one of the amplitude, the timing, or the shape deviates from a defined tolerance, generate an error message.

10. The active illumination 3D sensor system of claim 1, further comprising:

an output optic configured to shape light emitted by the illumination source;

a monitor photodiode configured to measure at least one of an average optical power, an average optical pulse shape, or an average optical pulse amplitude of back-reflected light emitted by the illumination source and reflected from a surface of the output optic; and a driver chip configured to regulate a shape of current pulses that drive the illumination source based on the at least one of the average optical power, the average optical pulse shape, or the average optical pulse amplitude.

11. The active illumination 3D sensor system of claim 1, further comprising:

an output optic configured to shape light emitted by the illumination source;

an input optic configured to focus the received light from the monitored area onto the image sensor;

at least one diagnostic illumination source oriented to emit light across an external surface of at least one of the input optic, the output optic, or a protective window of the sensor system at a glancing angle relative to the external surface; and at least one detector oriented to receive a subset of the light reflected from the external surface, wherein the at least one detector is configured to monitor at least one of an amplitude of the subset of the light or a direction from which the subset of the light is received at the detector, and in response to determining that at least one of the amplitude or the direction deviates from a defined tolerance, generate an error message.

12. A method for performing diagnostics on an active illumination three-dimensional (3D) sensor, comprising:

emitting, by an illumination source of the 3D sensor, light pulses to a monitored area;

emitting, by an auxiliary illumination source mounted inside a housing of the 3D sensor, auxiliary light pulses toward an inner surface of the housing;

measuring, by an image sensor of the 3D sensor, a subset of the auxiliary light pulses reflected from the inner surface and received at a pixel of the image sensor as reflected auxiliary light pulses to yield test measurement data, wherein the measuring comprises:

performing multiple iterations of the emitting and the measuring; and generating multiple test measurement data values corresponding to the multiple iterations, respectively, based on measurements of the subset of the auxiliary light pulses taken by the pixel during the respective iterations;

generating a temporal sequence of the multiple test measurement data values as a function of the time of the emitting relative to the time of the measuring to yield sequenced data;

generating waveform data for the pixel based on the sequenced data; and generating diagnostic data for the pixel based on analysis of the waveform data, wherein the diagnostic data indicates a failure of the 3D sensor;

generating an illumination trigger signal that controls the emission of light pulses by the illumination source of the 3D sensor and a sensor trigger signal that controls exposure of the pixel of the image sensor;

generating a shadow illumination trigger signal having a same timing as the illumination trigger signal, and a shadow sensor trigger signal having a same timing as the sensor trigger signal;

monitoring for deviations between the illumination trigger signal and the shadow illumination trigger signal;

monitoring for deviations between the sensor trigger signal and the shadow sensor trigger signal; and in response to detecting a deviation between the sensor trigger signal and the shadow sensor trigger signal, generating an error signal.

13. The method of claim 12, wherein the measuring comprises setting a time between emission of each of the auxiliary light pulses and exposure of the pixel to simulate a pulse propagation time corresponding to a defined distance of a measured object within the 3D sensor's field of view, and the generating the diagnostic data comprises:
calculating a simulated distance based on measurement of the subset of the auxiliary light pulses, and
in response to determining that the simulated distance is not within a defined tolerance range of the defined distance, disabling the pixel and generating an error message.

14. The method of claim 12, wherein the generating the diagnostic data further comprises:
comparing values of the waveform data corresponding to respective times of the emitting relative to the time of the measuring with expected values of the waveform data for the respective times, and
in response to determining that one or more of the values of the waveform data deviate from their corresponding expected values in excess of a defined tolerance, disabling the pixel and generating an error message.

15. The method of claim 12, wherein the generating the diagnostic data further comprises:
comparing a property of a characteristic waveform defined by the waveform data with an expected value of the property defined for the pixel, wherein the property is at least one of a position of a peak of the characteristic waveform, a width of the peak, an amplitude of the characteristic waveform, or a shape of the characteristic waveform; and in response to determining that the property deviates from the expected value in excess of a defined tolerance, disabling or tagging the pixel and generating an error message.

16. The method of claim 12, further comprising applying a curve-fitting function to the sequenced data to yield waveform data for the pixel.

17. A method for performing diagnostics on an active illumination three-dimensional (3D) sensor, comprising:
emitting, by a first illumination source mounted inside a housing of the 3D sensor, auxiliary light pulses toward an inner surface of the housing;

measuring, by an image sensor of the 3D sensor, a subset of the auxiliary light pulses reflected from the inner surface and received at a pixel of the image sensor as reflected auxiliary light pulses to yield test measurement data;

generating, by one or more processors of the 3D image sensor, diagnostic data for the pixel based on analysis of the test measurement data, wherein the diagnostic data indicates a failure of the 3D sensor;

emitting, by a diagnostic illumination source, light across an external surface of the at least one of an input optic of the 3D sensor, an output optic of the 3D sensor, or a protective window of the 3D sensor at a glancing angle relative to the external surface;

receiving, by a detector, a subset of the light reflected from the external surface;

monitoring, by the detector, at least one of an amplitude of the subset of the light or a direction from which the subset of the light is received at the detector; and in response to determining, based on the monitoring, that at least one of the amplitude or the direction deviates from a defined tolerance, generating an error message.

18. The method of claim 17, further comprising:
generating, by the one or more processors of the 3D sensor, an illumination trigger signal that controls emission of light pulses by a second illumination source of the 3D sensor and a sensor trigger signal that controls exposure of the pixel of the image sensor;

generating, by the one or more processors of the 3D sensor, a shadow illumination trigger signal having a same timing as the illumination trigger signal, and a shadow sensor trigger signal having a same timing as the sensor trigger signal;

monitoring, by the one or more processors of the 3D sensor, for deviations between the illumination trigger signal and the shadow illumination trigger signal;

monitoring, by the one or more processors of the 3D sensor, for deviations between the sensor trigger signal and the shadow sensor trigger signal; and in response to detecting a deviation between the sensor trigger signal and the shadow sensor trigger signal, generating an error signal.

19. The method of claim 17, further comprising:
monitoring at least one of an amplitude, a timing, or a shape of current pulses driven through a second illumination source of the 3D sensor; and in response to determining that at least one of the amplitude, the timing, or the shape deviates from a defined tolerance, generating an error message.

* * * * *